(12) United States Patent
Perkins

(10) Patent No.: US 9,431,808 B1
(45) Date of Patent: Aug. 30, 2016

(54) ELECTRICAL CONNECTOR

(71) Applicant: Vernon Perkins, New York City, NY (US)

(72) Inventor: Vernon Perkins, New York City, NY (US)

(*) Notice: Subject to any disclaimer, the term of this patent is extended or adjusted under 35 U.S.C. 154(b) by 63 days.

(21) Appl. No.: 13/886,776

(22) Filed: May 3, 2013

Related U.S. Application Data

(60) Provisional application No. 61/676,204, filed on Jul. 26, 2012.

(51) Int. Cl.
*H02G 3/18* (2006.01)

(52) U.S. Cl.
CPC ...................... *H02G 3/18* (2013.01)

(58) Field of Classification Search
CPC ............ H02G 3/0481; H02G 15/007; H02G 3/0683; H01R 13/422; H01R 13/428
USPC ........... 174/21 R, 24, 68.1, 68.3, 96, 98, 50, 174/665, 658, 661, 668, 669; 285/404
See application file for complete search history.

(56) References Cited

U.S. PATENT DOCUMENTS

| | | | |
|---|---|---|---|
| 2,200,874 A * | 5/1940 | Dann .................. | H02G 3/0683 285/154.3 |
| 2,241,293 A | 5/1941 | Campbell | |
| 3,369,071 A | 2/1968 | Tuisku | |
| 3,858,151 A | 12/1974 | Paskert | |
| 4,103,101 A | 7/1978 | Maier | |
| 4,190,222 A | 2/1980 | Appleton et al. | |
| 4,641,863 A * | 2/1987 | Shemtov ..................... | 285/154.4 |
| 4,885,429 A | 12/1989 | Schnittker | |
| 5,068,496 A | 11/1991 | Favalora | |
| 5,789,706 A * | 8/1998 | Perkins ................ | H02G 3/0691 174/135 |
| 5,905,230 A | 5/1999 | Marik | |
| 6,043,432 A | 3/2000 | Gretz | |
| 6,142,818 A | 11/2000 | Hollesen et al. | |
| 6,642,451 B1 | 11/2003 | Gretz | |
| 6,727,429 B1 | 4/2004 | Koessler | |
| 6,872,886 B2 | 3/2005 | Kiely | |
| 7,064,273 B1 | 6/2006 | Kiely | |
| 7,078,623 B1 | 7/2006 | Sheehan | |
| 7,237,807 B2 * | 7/2007 | Hiyama et al. ............ | 285/141.1 |
| 7,709,755 B2 * | 5/2010 | Pfister ............................ | 174/668 |
| 2012/0024597 A1 | 2/2012 | Jafari | |

* cited by examiner

*Primary Examiner* — Jenny L Wagner
*Assistant Examiner* — Michael E Moats, Jr.
(74) *Attorney, Agent, or Firm* — Michael E. Zall

(57) ABSTRACT

An electrical connector for connecting an electrical conduit to a wall of a junction box having an opening therein and having edges surrounding the opening. The connector includes a connector body defining a conduit-supporting passageway having a conduit central axis, a proximal end, a distal end, and a sidewall extending between the proximal and distal ends, the distal end formed with a locating collar substantially encircling the connector body, the locating collar functioning to engage the edges of the opening in the junction box. The connector further includes a pressure lock mechanism for selectively and removably securing the connector body to the opening in the junction box.

5 Claims, 42 Drawing Sheets

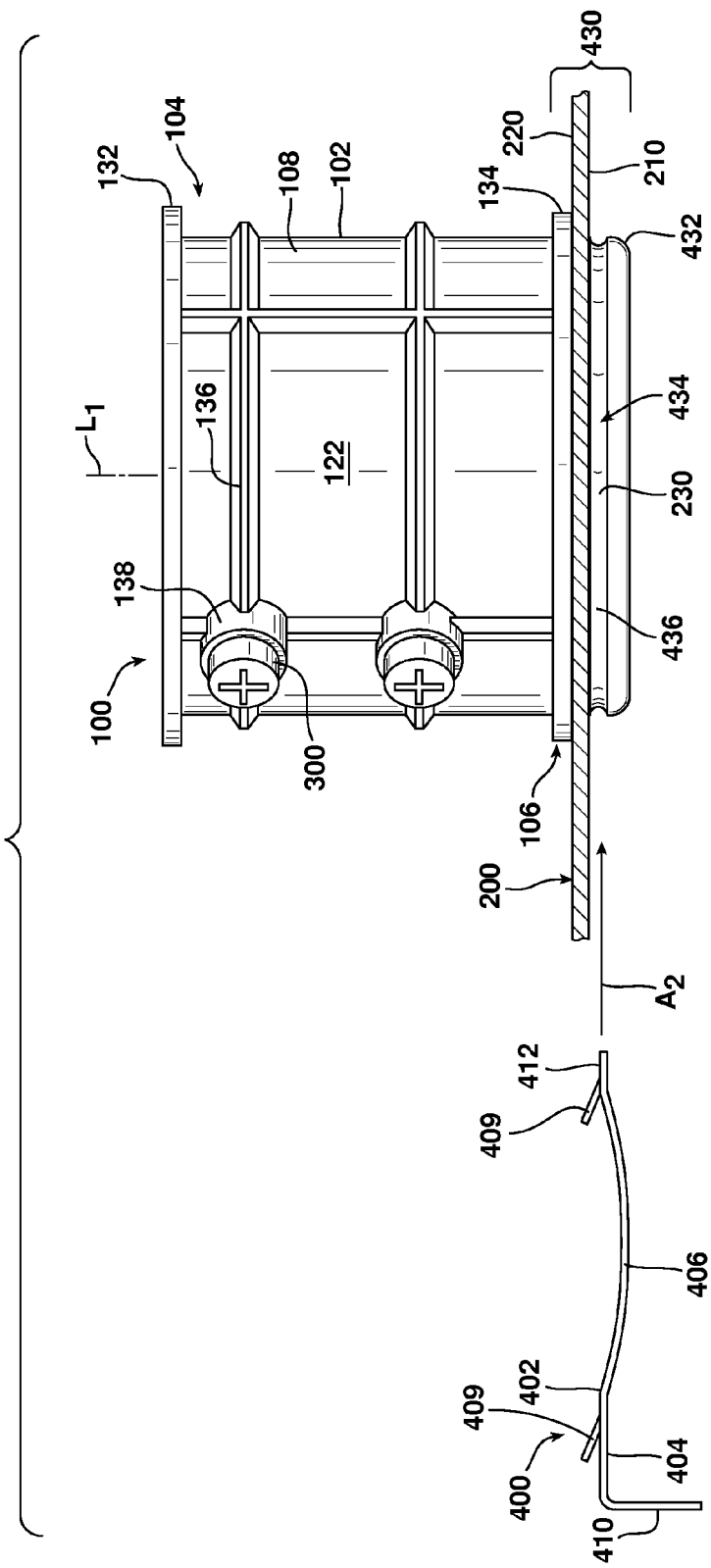

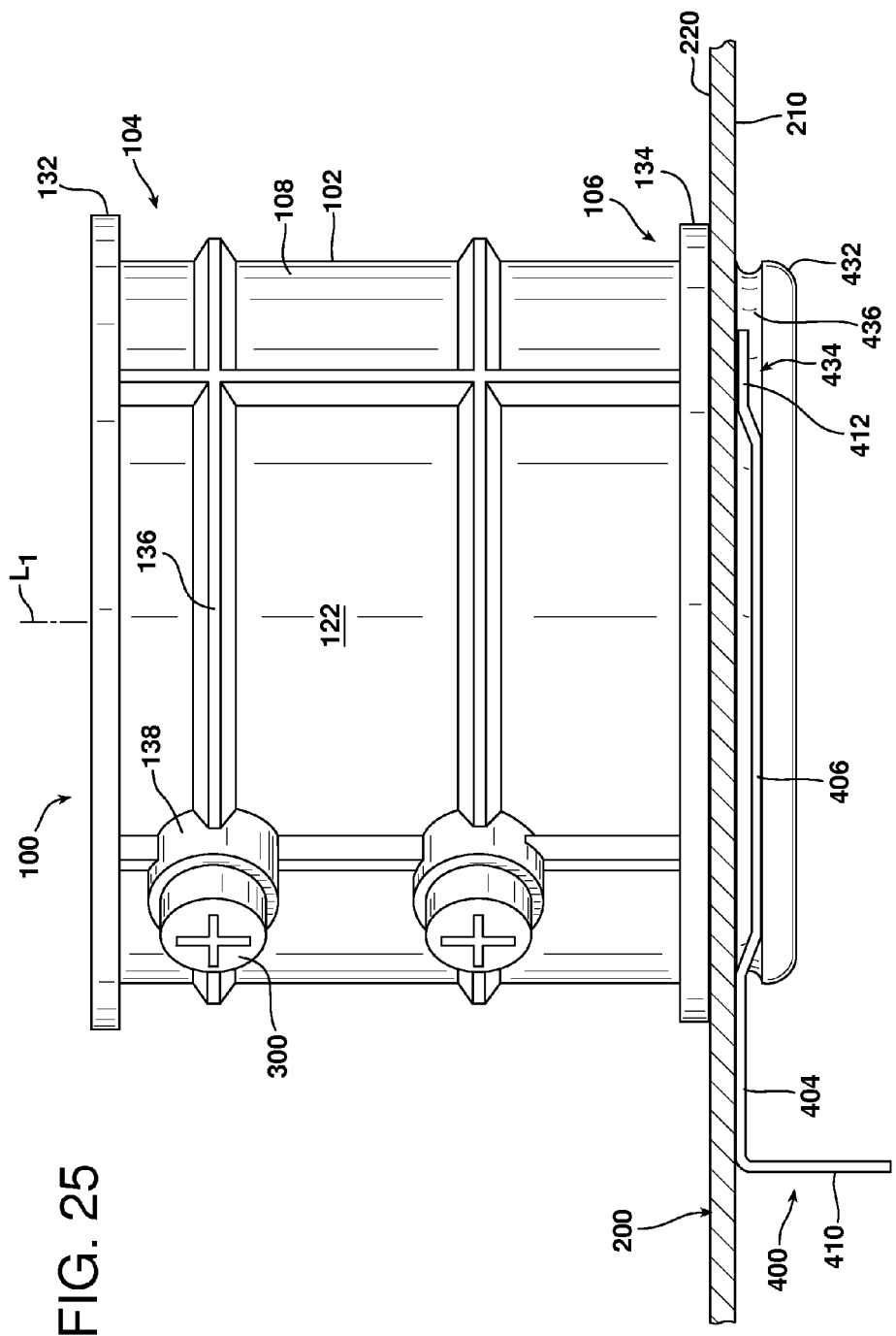

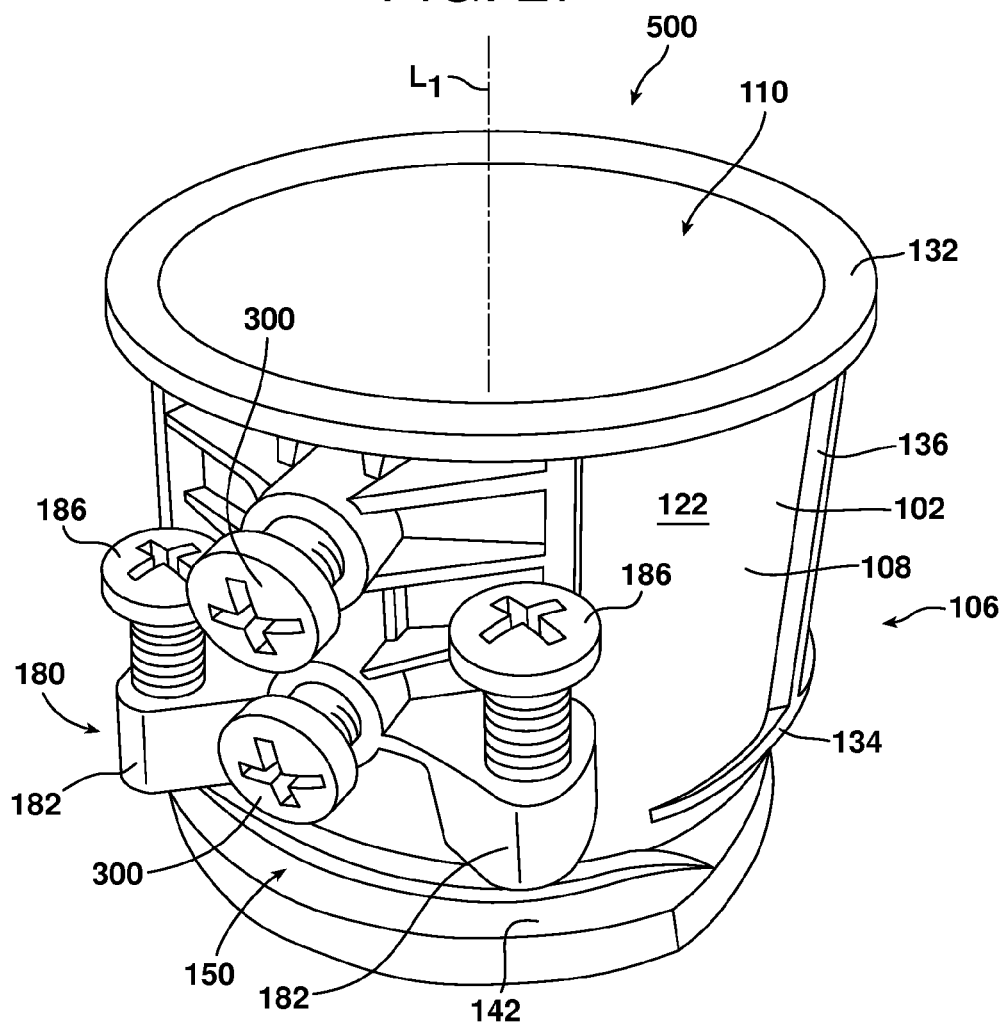

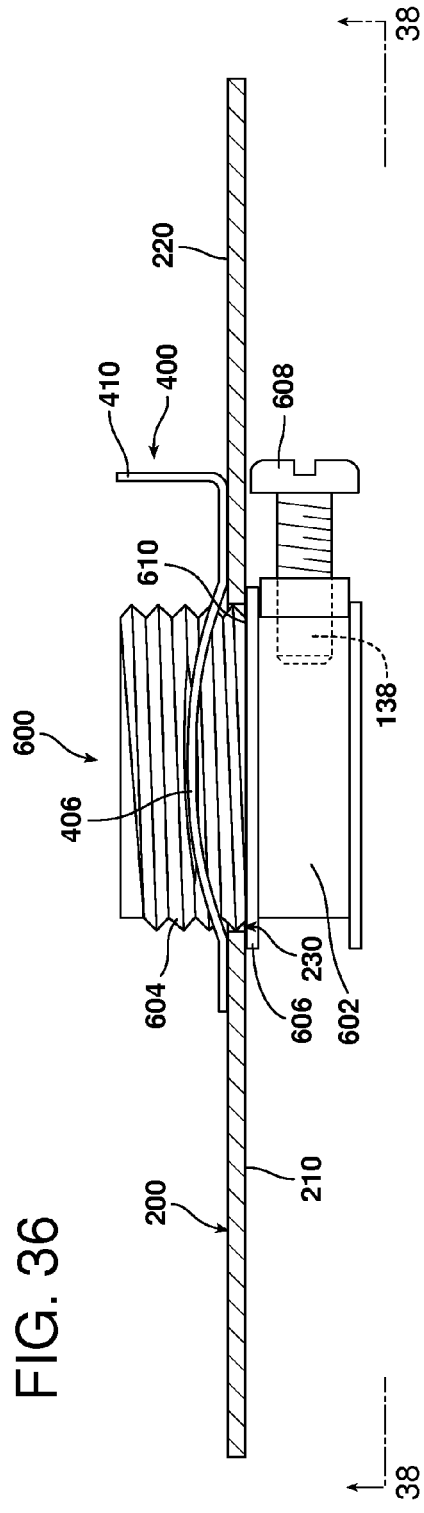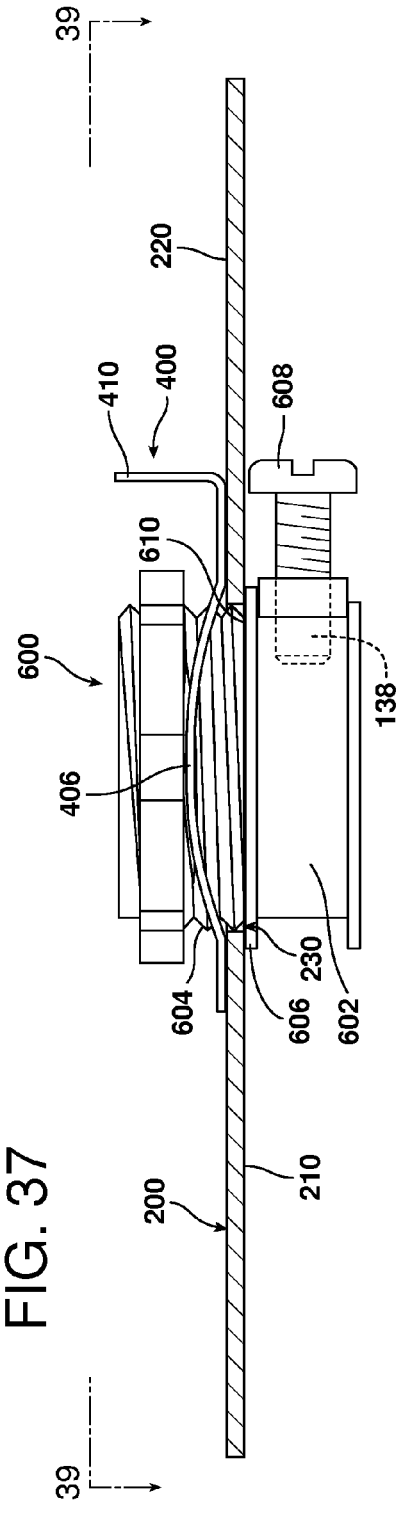

ELECTRICAL CONNECTOR

RELATED APPLICATIONS

This application claims the benefit under 35 USC Section 119(e) of U.S. Provisional Application No. 61/676,204 filed on Jul. 26, 2012, the entire disclosure of which is incorporated herein by reference.

BACKGROUND OF THE INVENTION

1. Field of the Invention

The present invention as described and claimed in this application relates to a connector used to connect an electrical conduit to a junction box or an outlet box, although it may be used on, for example, a pipe connector system and a post connector system. However, it is not limited to such environments and may be used, not only for example, as a connector for quickly, safely, and reliably connecting a fluid conduit, e.g., piping, system, but may be used in any system wherein a tubular member (rod, pipe, tube, cable, etc.) is required to be connected to an opening or hole.

2. Description of Related Art

Referring to electrical conduit connectors, such connectors are used to connect an electrical conduit or cable to a junction box. The junction box can be a variety of electrical enclosures such as an outlet box, transformer enclosure, circuit panel, lighting fixture, etc. The electrical conduit may be rigid or flexible, or could be in the form of tubing capable of routing electrical wires or cables. Such cables may be non-metallic sheathed cable, portable cord, or a variety of other types of electrical conductors. Commercial and residential buildings alike may have electrical installations that require different types of conduit-to-junction-box connections that utilize electrical connectors. Further, machinery and equipment also require conduit connectors to safely carry electrical wiring through cabinetry or housings.

Two common types of electrical connectors known in the electrical connector field are a snap-in connector and a multi-part locknut connector, which may be comprised of two or more components that include a threaded male end in conjunction with a threaded female locknut. In the case of the two-part locknut connector, the male threaded end is inserted into the junction box through a knockout hole opening. A rigid connection is established by threading the locknut onto the male end in the junction box interior. An example of a two-part locknut connector is found in U.S. Pat. No. 4,885,429 to Schnittker. The snap-in connector is another connector commonly used in the electrical connector field, which utilizes a snap-in portion used to connect quickly the connector to the junction box. Examples of snap-in type electrical connectors may be found in U.S. Pat. No. 2,241,293 to Campbell; U.S. Pat. No. 4,641,863 to Shemtov, and U.S. Pat. No. 5,789,706 to Perkins. A snap-in type electrical connector is also disclosed in U.S. Pat. No. 7,078,623 to Sheehan, incorporated herein by reference, which discloses an electrical connector that utilizes a compression nut and a body. Either of the foregoing types of electrical connectors is integrated with a conduit engagement mechanism at one end, which allows the attachment of conduit, cable, or a variety of types of hollow tubing.

The installation of electrical systems is generally expensive and labor intensive as an electrician must first install the enclosures, route conduit between each enclosure, install connectors, and then pull all necessary electrical wiring through the conduit. Electrical installation is expensive primarily because it is labor intensive. The presently commercially available electrical connectors are labor intensive to install.

Mare particularly, the two-part locknut connectors are shipped from the manufacturer preassembled. Thus, the electrician must first remove the threaded locknut from the male end before it can be installed in the junction box. Once the male end of the connector is placed through the knockout hole in the junction box, the electrician must rethread the locknut onto the connector from the interior of the junction box. Because both hands are required to disassemble the two-part locknut connectors and then reassemble the connectors after insertion in the knockout hole, it is difficult to hold a tool or a piece of conduit while reassembling the connector. Once the locknut is threaded, it must be tightened. In accordance with many building codes and safety regulations, connectors must be reliably and securely attached to junction boxes. To tighten properly the two-part locknut connector, the electrician must use a tool within the interior confines of the junction box enclosure, usually with a set of pliers or a screwdriver. Occasionally, when the proper tool is not available, an electrician will use the wrong tool or simply finger-tighten the connector. Such finger-tightened two-part locknut connectors can eventually loosen causing a strain on the electrical wires and their connections, increasing the probability of an electrical fire or other electrical problems, such as a poor grounding.

Additionally, when the electrician disassembles such a two-part locknut connector, the locknut often is dropped or misplaced. Compounding the situation, the electrician is often in an elevated location, such as, on a ladder, scissor lift, or on scaffolding, because electrical conduit is often installed in out-of-the-way elevated places like in rafters and above ceilings. If the dropped locknut cannot be found, the connector is useless and replaced. Even if the dropped locknut is retrieved, time is wasted and the installation delayed.

Another common problem with present two-part locknut connectors is that the locknut is easily cross-threaded onto the male thread. When this occurs, the electrician must generally use two tools to remove the locknut. On occasion, cross threading the locknut will damage the male threads on the connector making it difficult or impossible to reuse the connector. Again, the electrician must spend time either removing the defective connector or forcing the locknut through the damaged portion of the threads.

A further problem with present two-part locknut connectors is the distance the male end protrudes into the junction box. In some installations, the space inside the enclosure is already minimal. The space limitation becomes an acute problem when an additional connector is installed. Often the male threaded end protrudes well past the depth of the locknut and may interfere with another connector, the apparatus and electrical connections and wiring inside the junction box. Often this requires removal of the excess threading on the male connector. Typically, the electrician saws-off the excess thread, may clip-off some of the receptacle or mounting screws, or completes a combination of space enlarging modifications, all of which prolong installation time and threaten the integrity of the system as designed.

Yet another common problem with present two-part locknut connectors occurs during disassembly of the connector from the enclosure. Electricians may disassemble an installation for a variety of reasons. The disassembly of the two-part locknut connector is more time consuming than the installation. If the locknut was installed properly, that is by tightening it with a tool, and then the locknut must be removed with a tool within the interior confines of the electrical enclosure. If the threads are damaged during disassembly (or even when previously assembled), the connector is useless and must be replaced. If during disassembly the locknut is lost, it must be replaced. If the connector was "modified" during installation, e.g., because of space limitations inside the junction box enclosure, disassembly of two-part locknut connector may be exceedingly difficult or impossible, most likely because the male connector has been damaged.

The snap-in connector presents similar problems. The most significant problem is that these connectors, in most cases, do not create a rigid connection. Because the snap-in portion is sized to accept a variety of junction box wall thickness, it does not rigidly attach to many such boxes. The loose fit may cause electrical continuity problems, which can be a highly dangerous situation because in many applications the box, the conduit, and the connector are intended to be part of the electrical grounding system.

Another problem with the snap-in connector is that, in most cases, the snap-in portion of the connector must deform to flex and fit through a circular hole having a smaller diameter, so its form precludes easy removal or reuse and the connection is typically destroyed upon removal. Generally, any process other than direct force fit installation is time consuming and laborious. Examples of such flexible snap-in connectors may be found in U.S. Pat. No. 3,369,071 to Tuisku, U.S. Pat. No. 3,858,151 to Pasker, and U.S. Pat. No. 6,043,432 to Gretz.

The following are additional U.S. patents and published applications of interest:
  U.S. Pat. No. 4,103,101 to Maier
  U.S. Pat. No. 4,190,222 to Appleton et al.
  U.S. Pat. No. 5,068,496 to Favalora
  U.S. Pat. No. 5,905,230 to Marik
  U.S. Pat. No. 6,142,818 to Hollesen et al.
  U.S. Pat. No. 6,642,451 to Gretz
  U.S. Pat. No. 6,727,429 to Koessler
  U.S. Pat. No. 6,872,886 to Kiely
  U.S. Pat. No. 7,064,273 to Kiely
  2012/0024597 to Jafari To summarize the foregoing, while two-part locknut connectors and snap-in connectors present major challenges to the electrical installer, the two-part locknut connector is often used to provide a wide variety of main power connections and branch circuit connections and snap-in connectors are often used for branch circuit connections. There remains an unfulfilled need to provide a simple, compact, and rigid electrical connector which is reusable and which can be quickly and simply installed or uninstalled from the exterior wall surface of an enclosure and also capable of providing a wide variety of main power applications and branch circuit connections for commercial, residential and equipment connections and applications.

SUMMARY OF THE INVENTION

The universal connector of this invention is exemplified by connectors used to connect an electrical conduit to a junction box, or outlet boxes. The electrical conduit to junction box connection system, as described in detail herein, is designed to be installed quickly and easily from the exterior or interior wall surface of the junction box. Additionally, the electrical connector used in such a connection system improves safety because it provides a substantially rigid and stable connection.

The fastening end of the connector generally seats flush with the wall surface surrounding the diameter of a knockout hole opening or hole into the enclosure within the junction box. The electrical connector incorporates a pressure lock mechanism that pulls the connector body tightly to the wall surface of the enclosure to make a substantially solid, rigid, and strong connection while conserving space within the enclosure. The connector body has a throughway, or bore that defines a leading or distal end and a trailing or proximal end. The leading or distal end secures the connector body to a diameter of the knockout hole opening or hole in the junction box or outlet. The trailing or proximal end directs cable or conduit to its termination point within an electrical enclosure.

The electrical connector system of this invention includes an electrical connector and a junction box, with the electrical connector adapted to direct an electrical conduit to a termination point within the junction box. Typically, the junction box has a number of prefabricated holes each of which is often called a knockout hole. To insert any connector to the junction box, the knockouts must be exposed by "knocking out" a cover piece or perforating the prefabricated holes along perforation lines. Alternately, some junction boxes do not have prefabricated knockouts. In this situation, the knockout holes are cut in the desired location with a punch and die set or a drill bit or hole saw, and like methods.

In one embodiment, an electrical connector system is provided which comprises a junction box defining at least one knockout hole opening and a connector body defining a conduit-supporting passageway. The connector body comprises a proximal end and a distal end and has a sidewall extending between the proximal and distal ends. The distal end is formed with an engaging portion for engaging an opening in the junction box. The connector body defines a distal facing bearing surface. The engaging portion comprises a foot portion, a locating ledge, and a locating collar. The foot portion comprises a leading lug defining a leading perimeter edge, a trailing lug defining a trailing perimeter edge, and lateral walls connecting the leading perimeter edge and the trailing perimeter edge. The leading lug and the trailing lug each define a proximal facing seating surface, and the respective lateral walls have a proximal edge and a distal edge. The locating ledge is formed on the leading lug-seating surface and defines a leading locating surface and proximal facing locating surface. The proximal facing locating surface slopes from a central high point to the proximal edge of the respective lateral walls. The locating collar is formed adjacent the trailing lug so as to be positioned between the distal facing bearing surface on the connector body and the trailing lug. The locating collar generally defines a recessed trailing locating surface. The engaging portion may be formed adjacent a distal flange extending at least partially about the connector body and defining the distal facing bearing surface and the trailing lug.

A pressure lock mechanism may be used to removably secure the connector body to the junction box. The pressure lock mechanism may comprise a sleeve extending outward from the sidewall of the connector body and defines a sleeve opening. A securing fastener may be engaged in the sleeve opening. The sleeve may extend outward from the sidewall over the leading lug. The sleeve opening may comprise a central axis that is generally parallel to a central axis of the conduit-supporting passageway in the connector body. The sleeve may extend outward from the sidewall over the leading lug such that a distal end of the securing fastener opposes the leading lug-seating surface.

The pressure lock mechanism may alternately comprise a cam element pivotally connected to the sidewall of the connector body and may be positioned to oppose the leading lug seating surface. The locating collar may extend about the connector body sufficiently to accept a securing spring clip comprising the pressure lock mechanism. The connector body may comprise a distal flange extending at least partially about the connector body and the engaging portion may be formed distally of the distal flange. The distal flange on the connector body may extend outward past the perimeter edge of the trailing lug.

Further details and advantages will become clear upon reading the following detailed description in conjunction with the accompanying drawings.

BRIEF DESCRIPTION OF THE DRAWINGS

The novel features believed to be characteristic of the present invention, together with further advantages thereof, will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

First Embodiment

Second Embodiment

Figure 16:
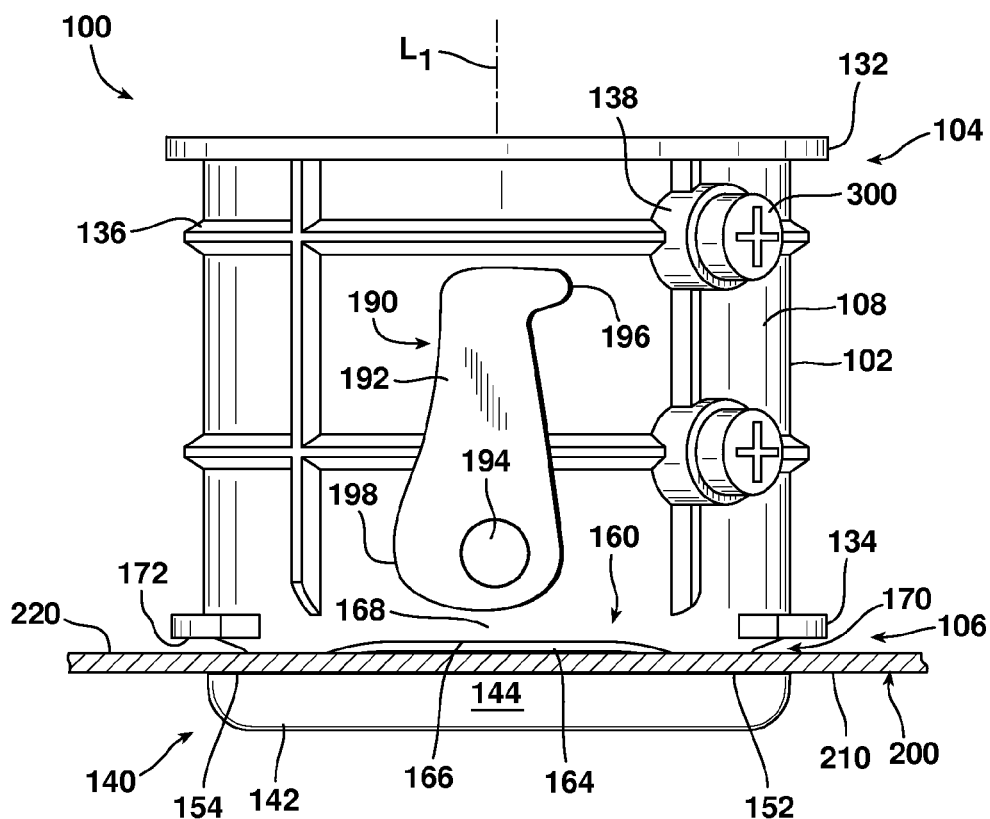

FIG. 16 is a front, partial cross-sectional view of another embodiment, i.e., a second embodiment, of the electrical connector of this invention prior to locking the electrical connector to a junction box, having a pressure lock mechanism in the form of a securing cam element.

Figure 17:
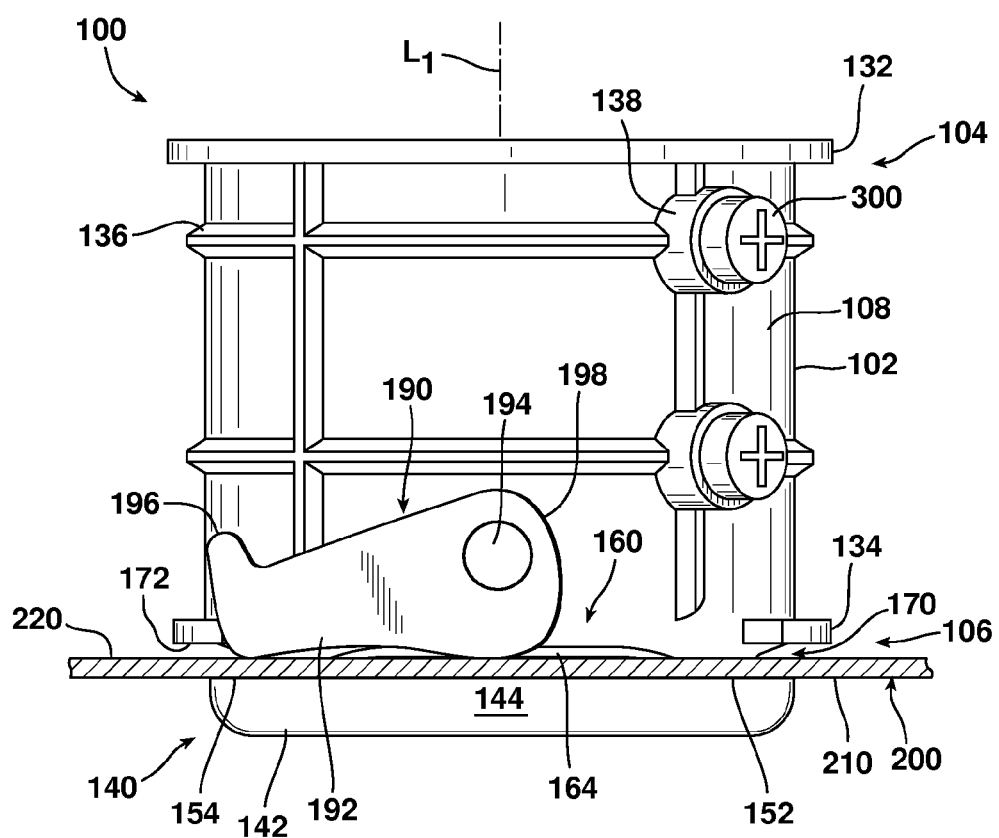

FIG. 17 is a front, partial cross-sectional view of the electrical connector of FIG. 16 showing the securing cam element in a locked state, locking the electrical connector to a junction box.

Third Embodiment

Figure 1:
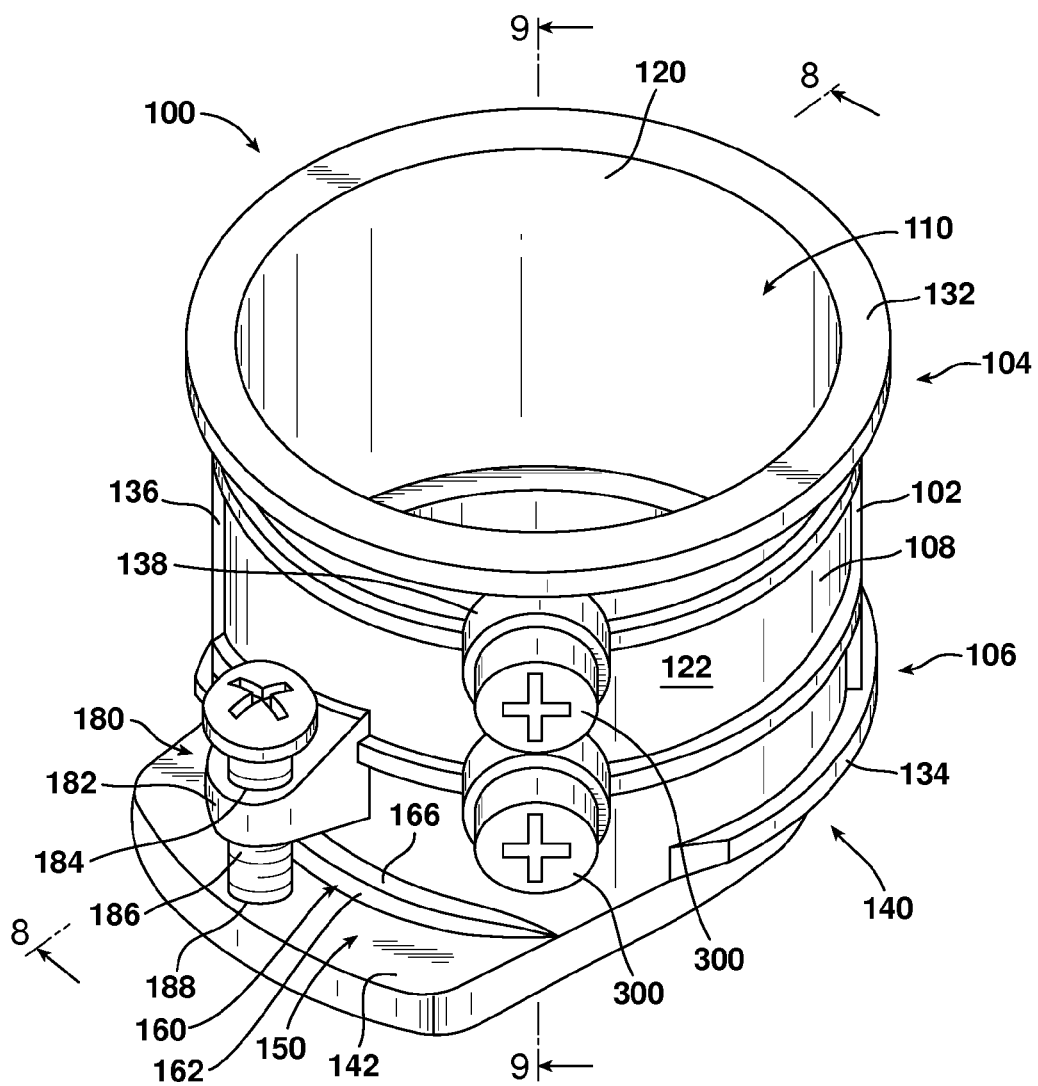
FIG. 1 is a perspective view of an embodiment, i.e., a first embodiment, of an electrical connector of this invention.
Figure 2:
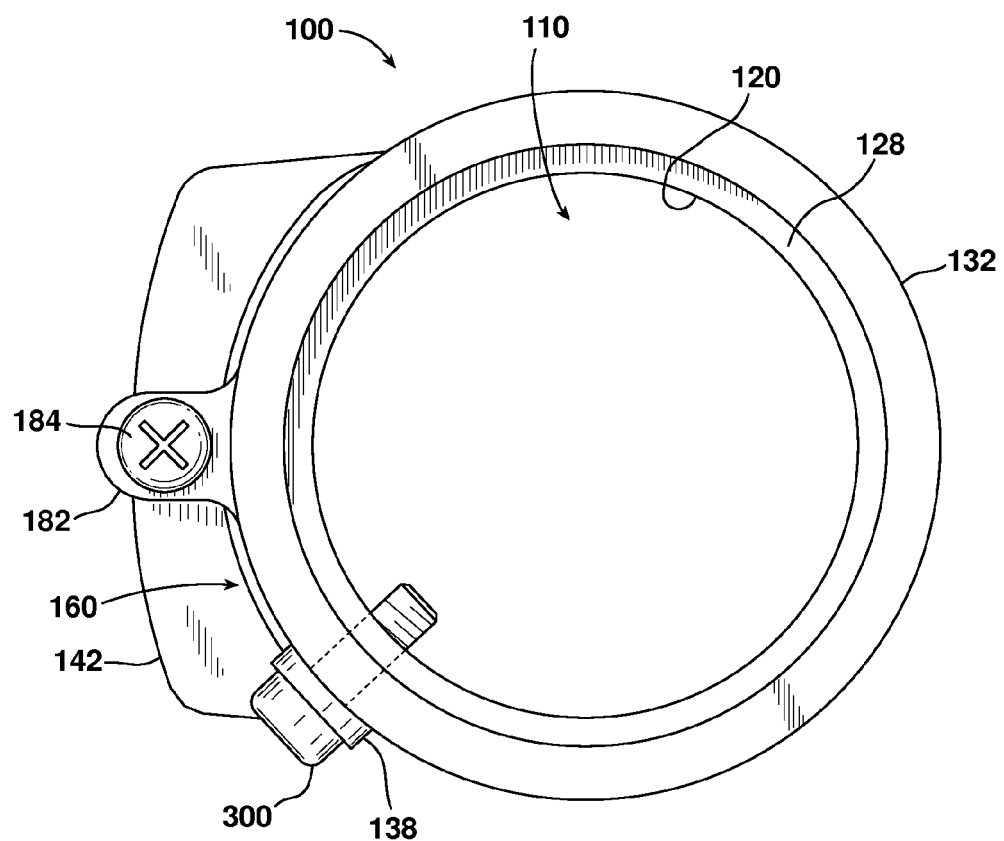
FIG. 2 is a top view of the electrical connector depicted in FIG. 1.
Figure 3:
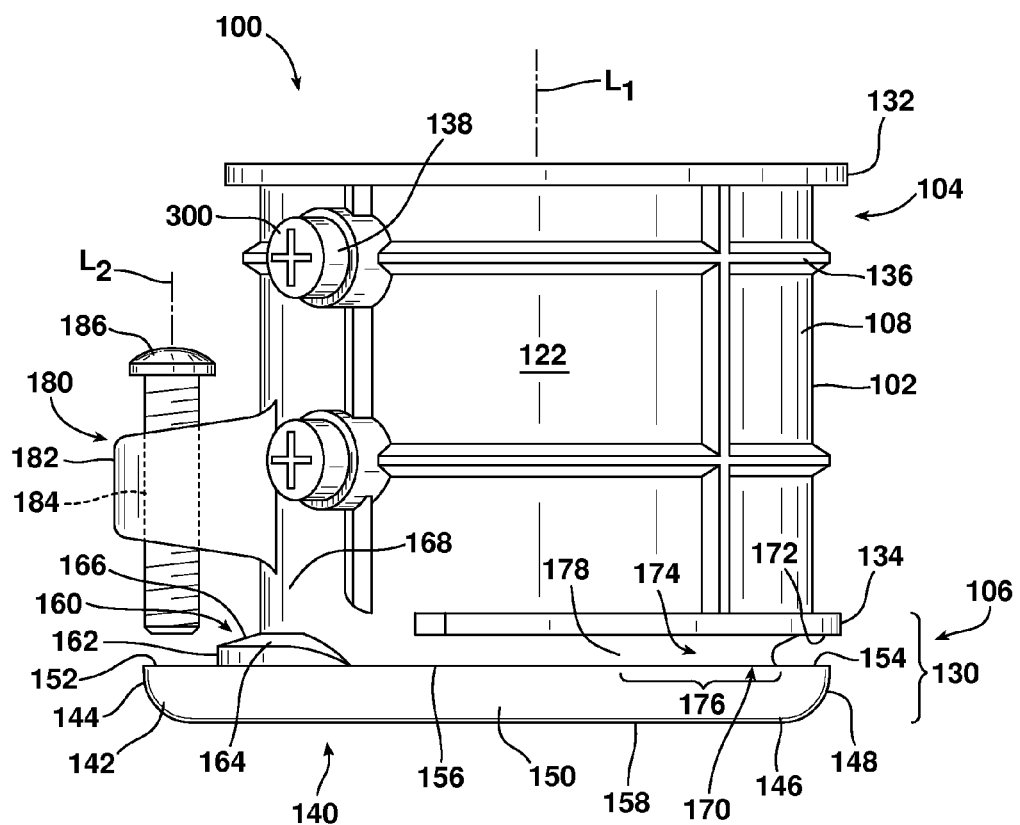
FIG. 3 is a left side view of the electrical connector depicted in FIG. 1.
Figure 4:
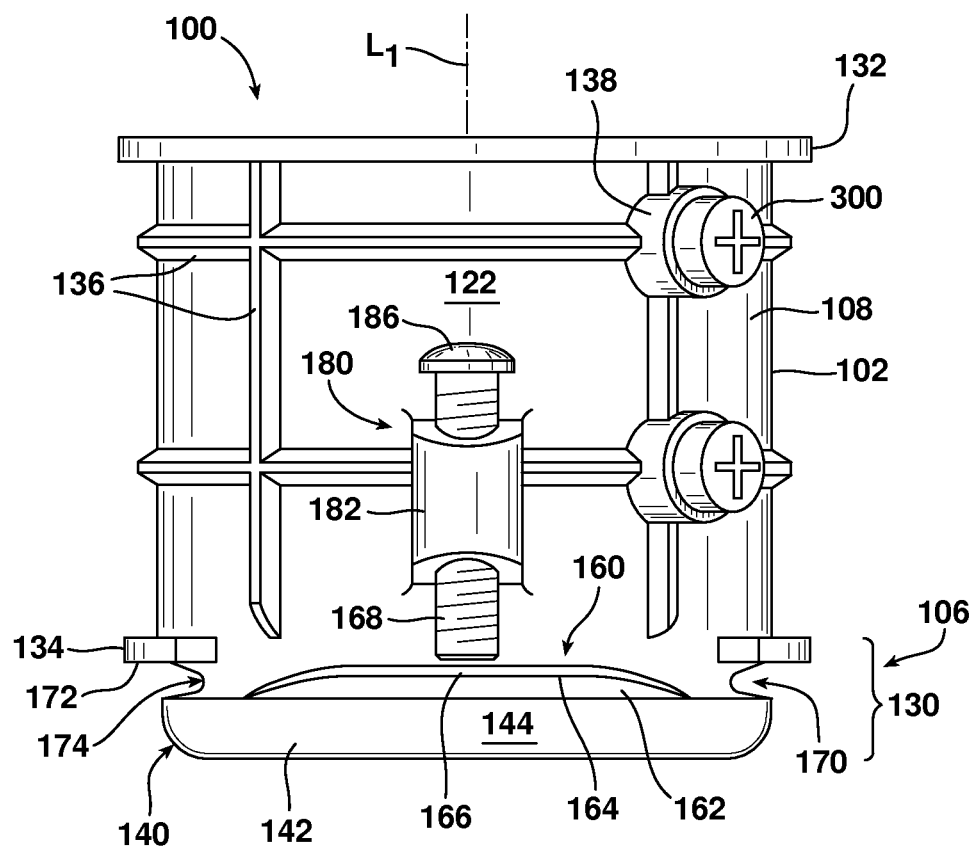
FIG. 4 is a front view of the electrical connector depicted in FIG. 1.
Figure 5:
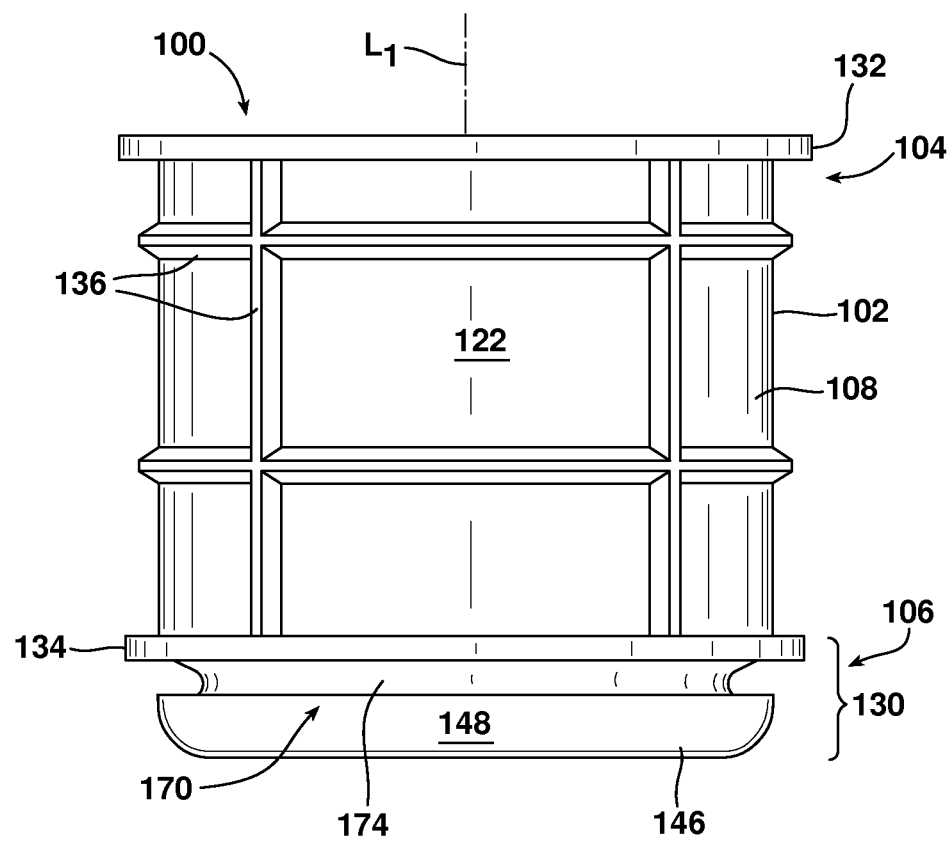
FIG. 5 is a rear view of the electrical connector depicted in FIG. 1.
Figure 18:
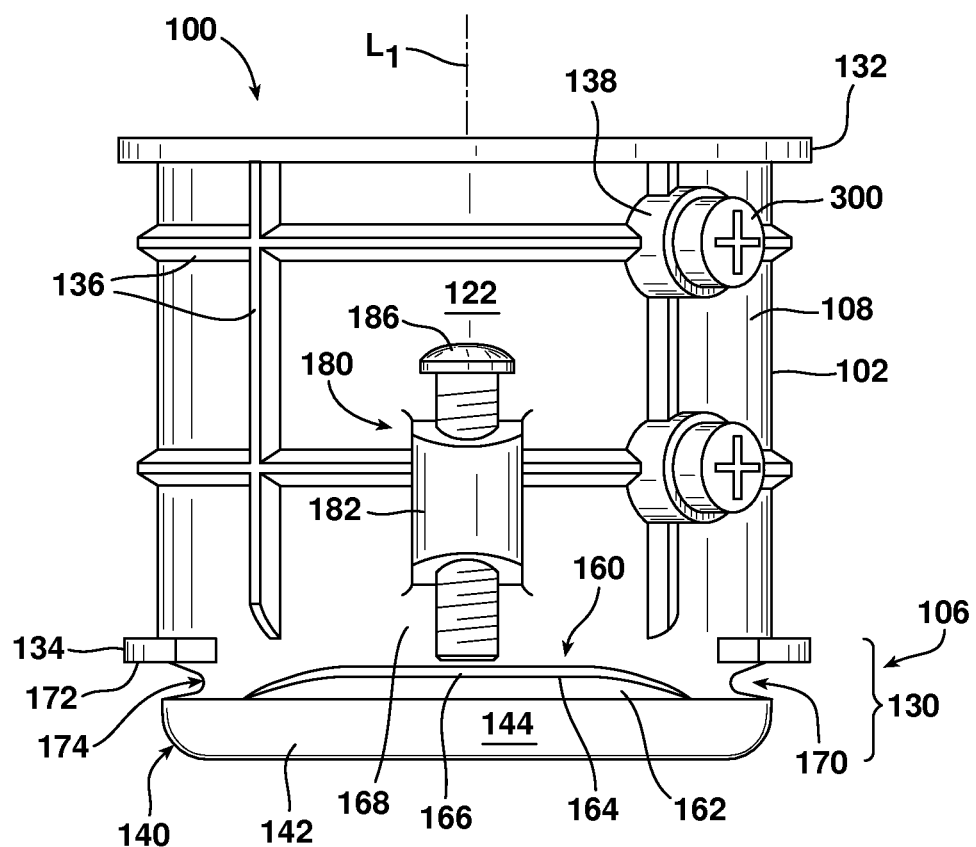

FIG. 18 is a front view of a modified embodiment, i.e., a third embodiment, of the electrical connector of this invention that similar to that in FIG. 1.

Fourth Embodiment

Figure 19:
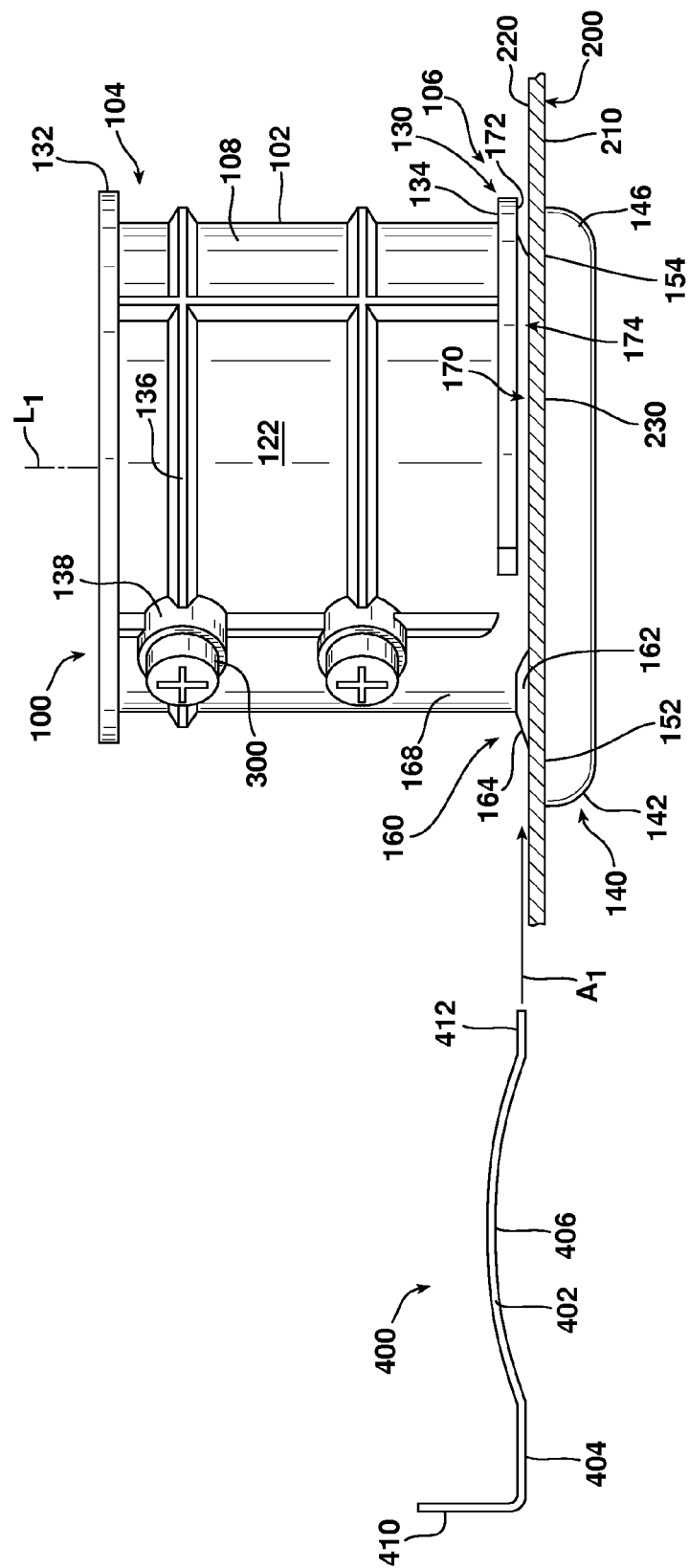

FIG. 19 is an exploded, partial cross-sectional view, of the fourth embodiment of the electrical connector having a pressure lock mechanism in the form of a securing spring clip for securing the electrical connector to a junction box.

Figure 20:
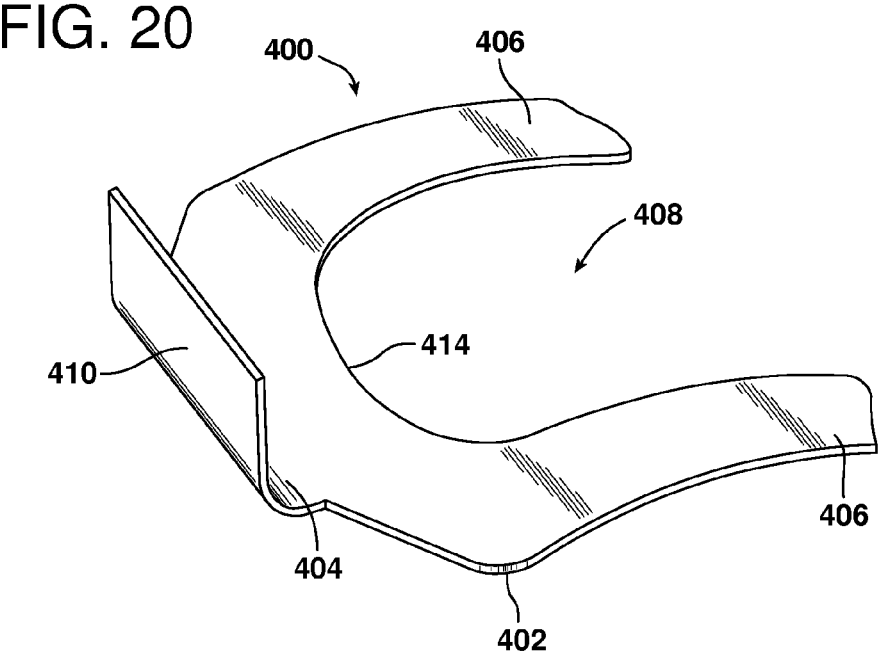
Figure 20A:
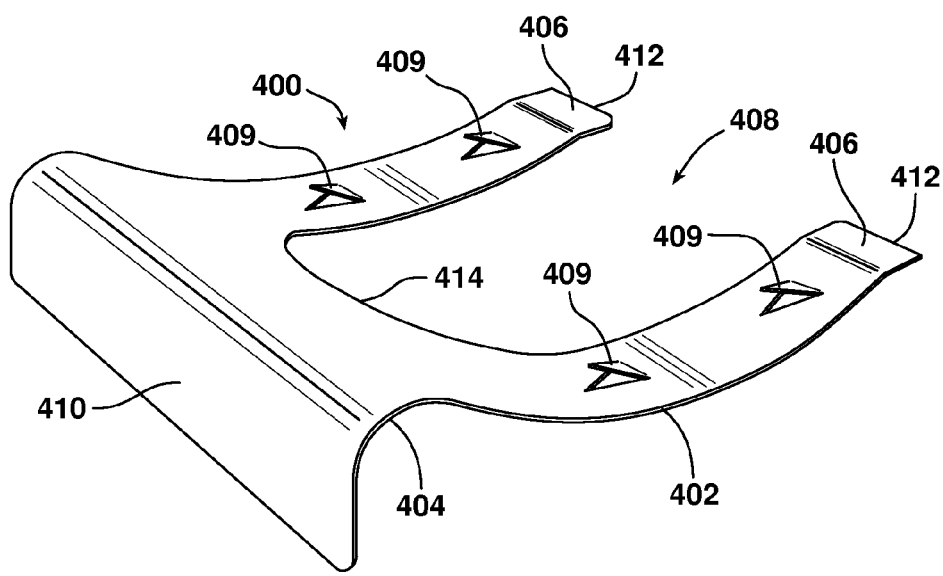

FIG. 20 and FIG. 20A are perspective views of two embodiments of the securing spring clip used as the pressure lock mechanism in the fourth embodiment of the electrical connector of this invention.

Figure 21:
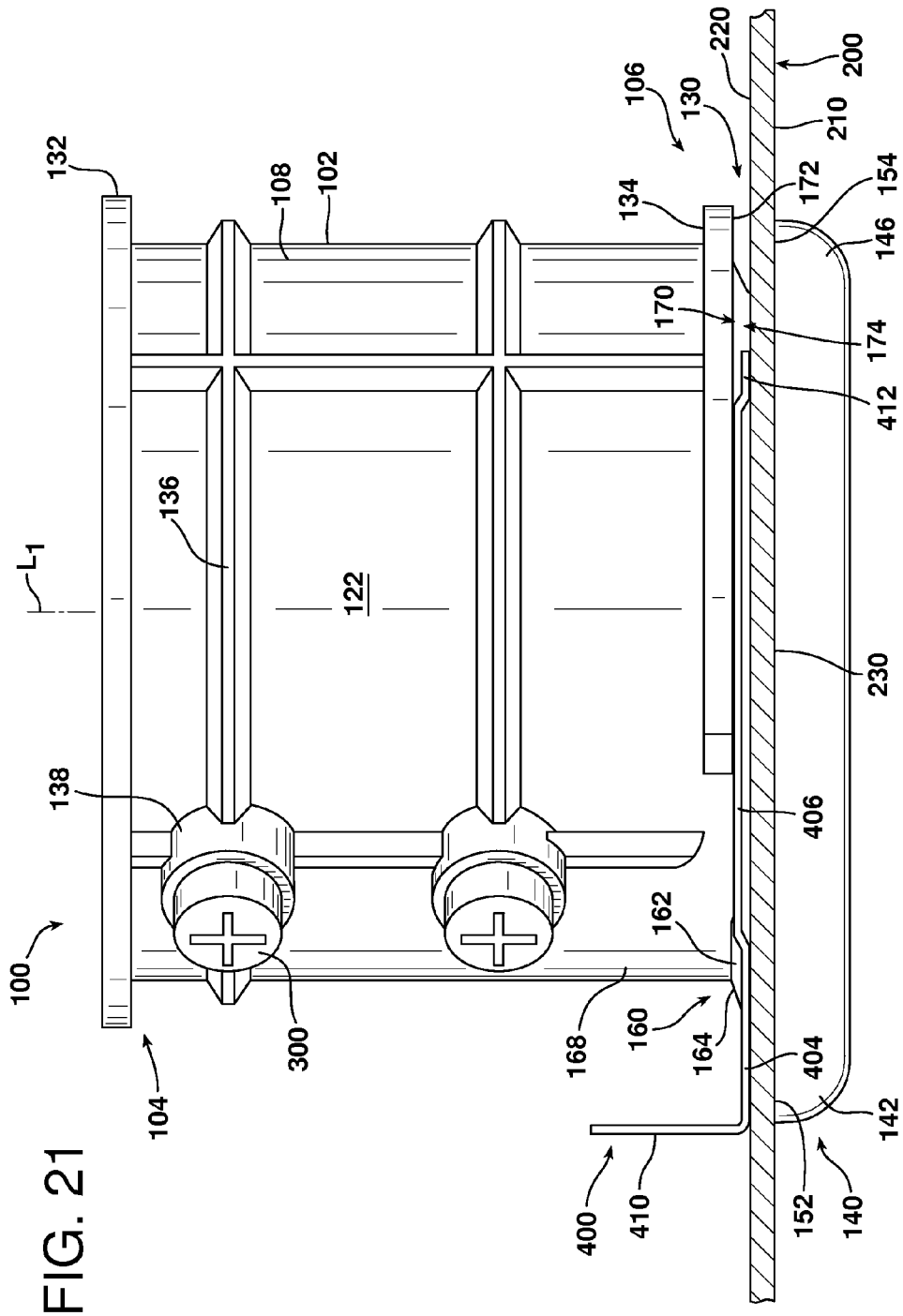

FIG. 21 is a side, partial cross-sectional view, of the fourth embodiment of the electrical connector of FIG. 19 showing use of the securing spring clip to secure the electrical connector to a junction box.

Fifth Embodiment

Figure 22:
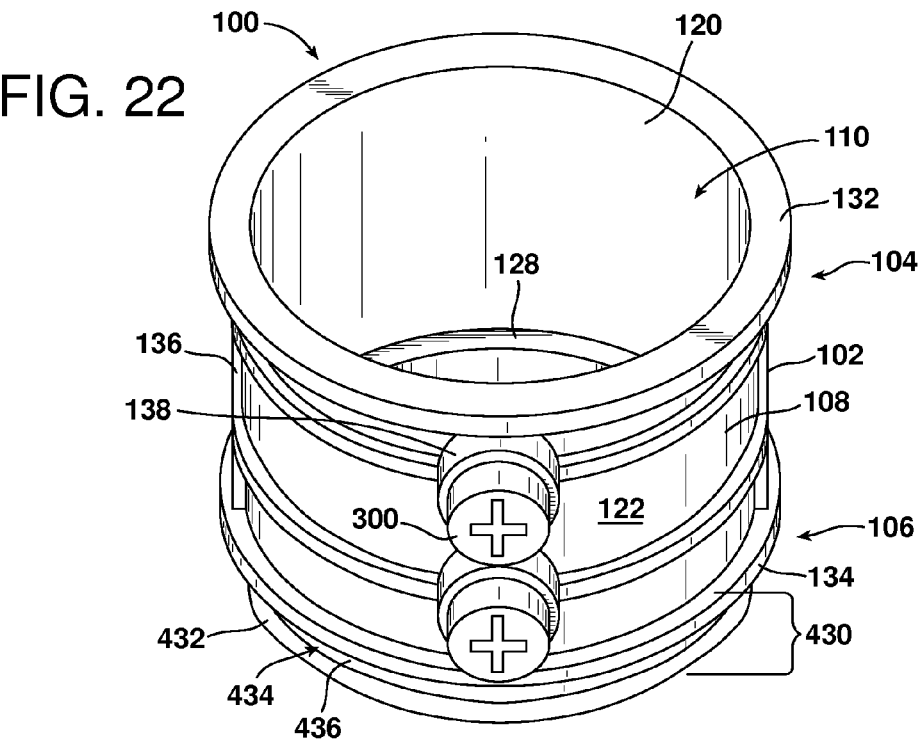

FIG. 22 is perspective view of an alternative embodiment, i.e., a fifth embodiment, of the electrical connector of this invention.

Figure 23:
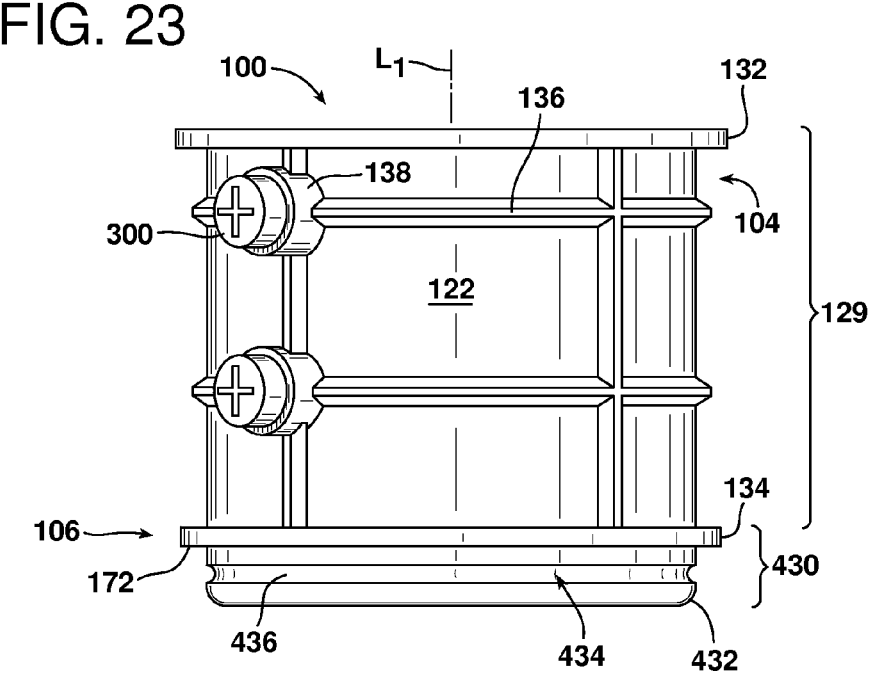

FIG. 23 is a side view of the fifth embodiment of the electrical connector depicted in FIG. 22.

Figure 24A:
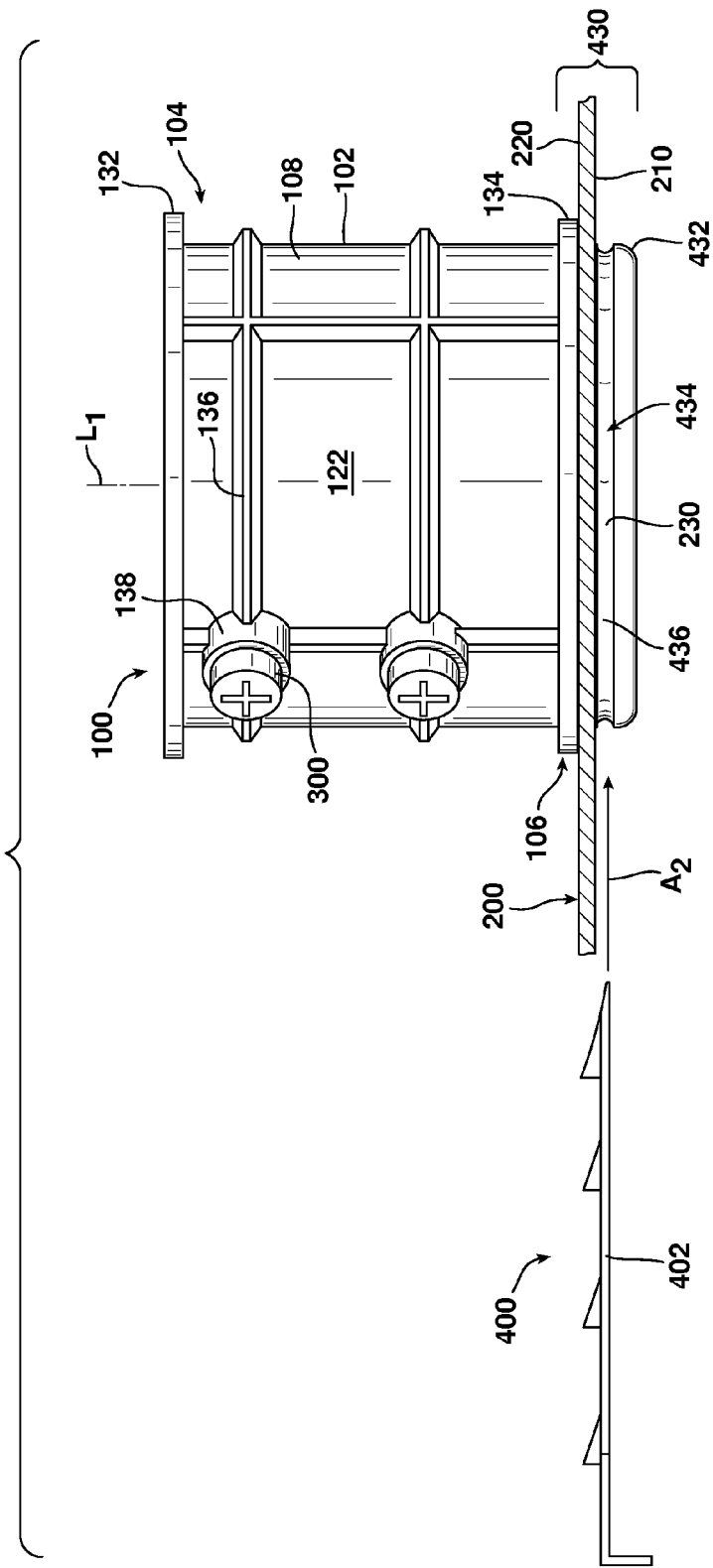
Figure 24B:
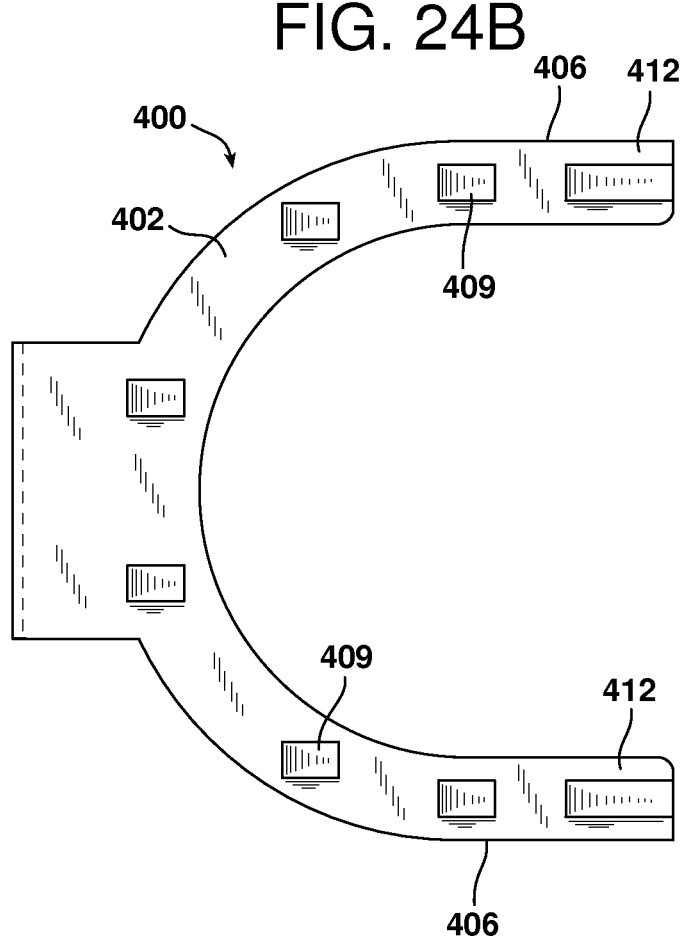

FIGS. 24 and 24A are an exploded, partial cross-sectional view, of the fifth embodiment of electrical connector of FIG. 22 showing installation of the securing spring clip to secure the electrical connector to a junction box.

FIG. 24 B is a plan view the securing spring clip used in FIG. 24 A. to secure the electrical connector to the junction box.

FIG. 25 is a side, partial cross-sectional view of the electrical connector of FIG. 22 showing use of another variation of the securing spring clip to secure the electrical connector to a junction box.

Sixth Embodiment

Figure 26:
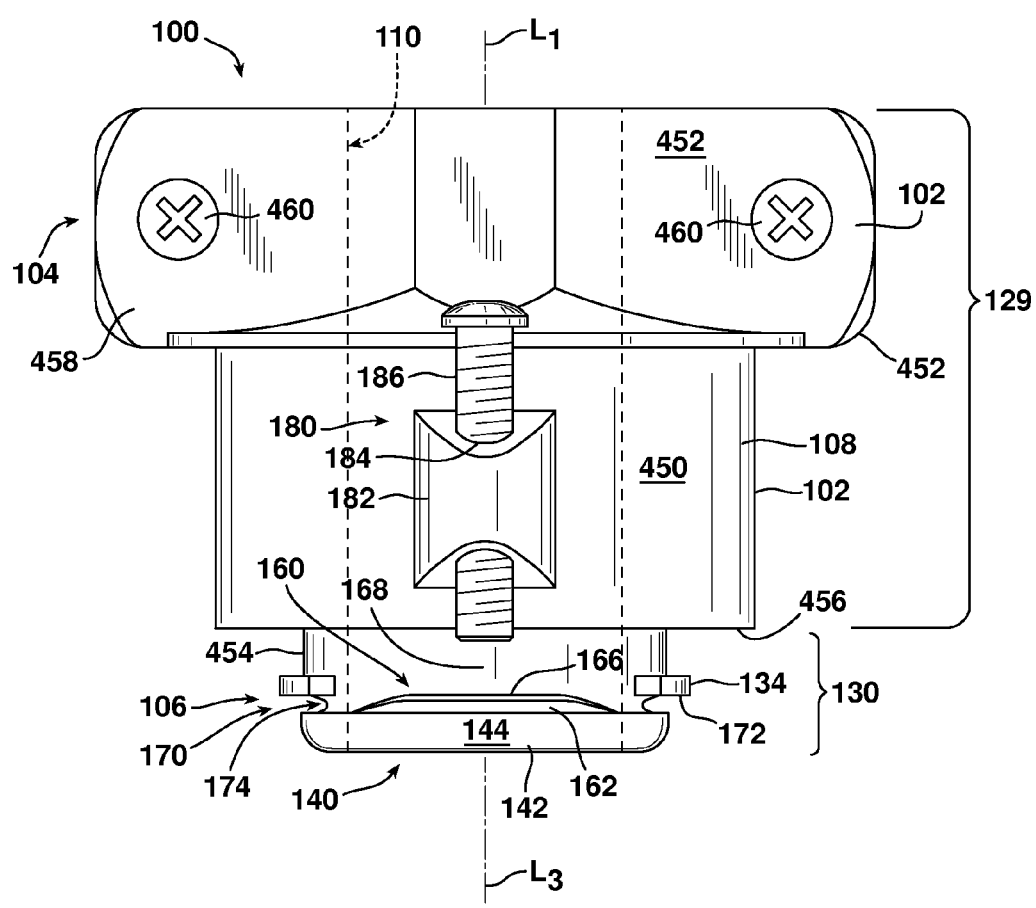

FIG. 26 is a front view of another embodiment, i.e., a sixth embodiment of the electrical connector.

Figure 26A:
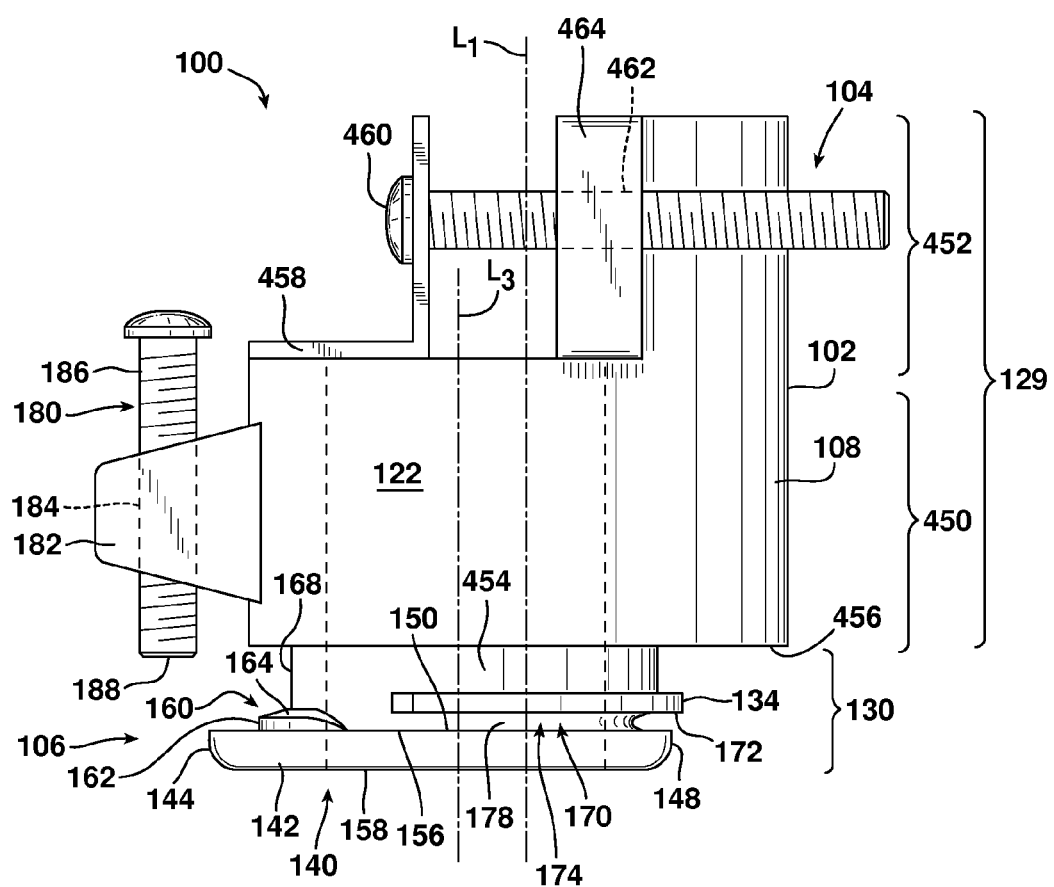

FIG. 26A is a side view of the sixth embodiment of the electrical connector.

FIG. 26 B is a rear view of the sixth embodiment of the electrical connector.

Seventh Embodiment

FIG. 27 is a perspective view of an alternative embodiment, i.e., a seventh embodiment, of the electrical connector.

Figure 28:
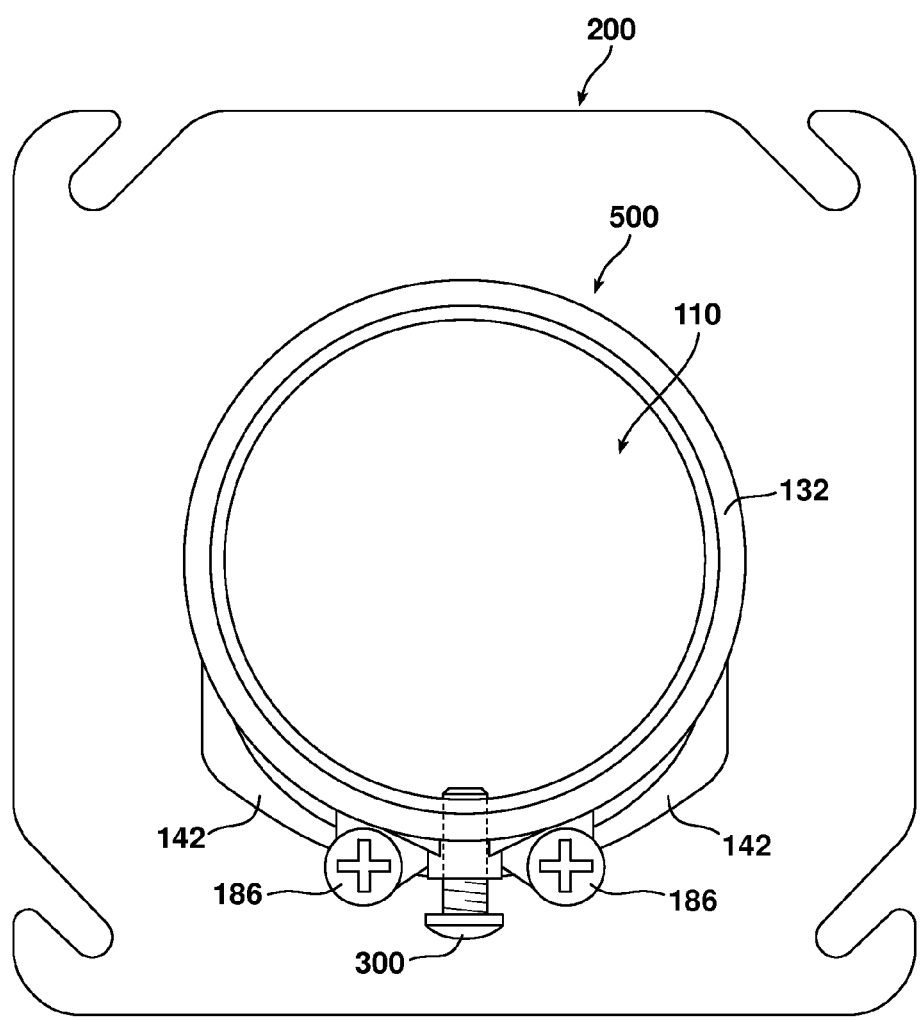

FIG. 28 is top view of the seventh embodiment of the electrical connector depicted in FIG. 27 mounted to a cover plate for a junction box.

Figure 29:
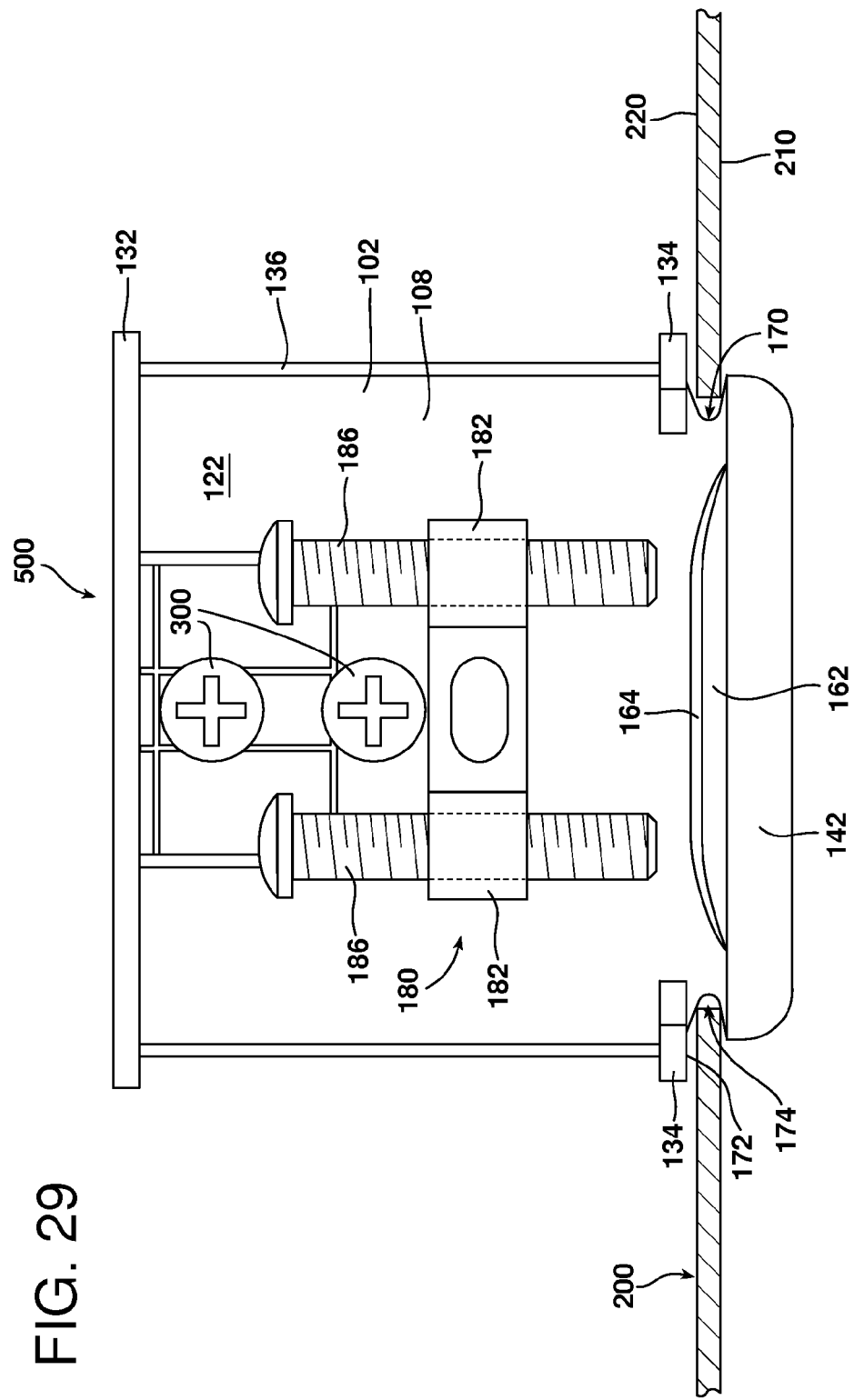

FIG. 29 is a side, partial cross-sectional view of the electrical connector of FIG. 27 prior to being secured to the junction box.

Figure 30:
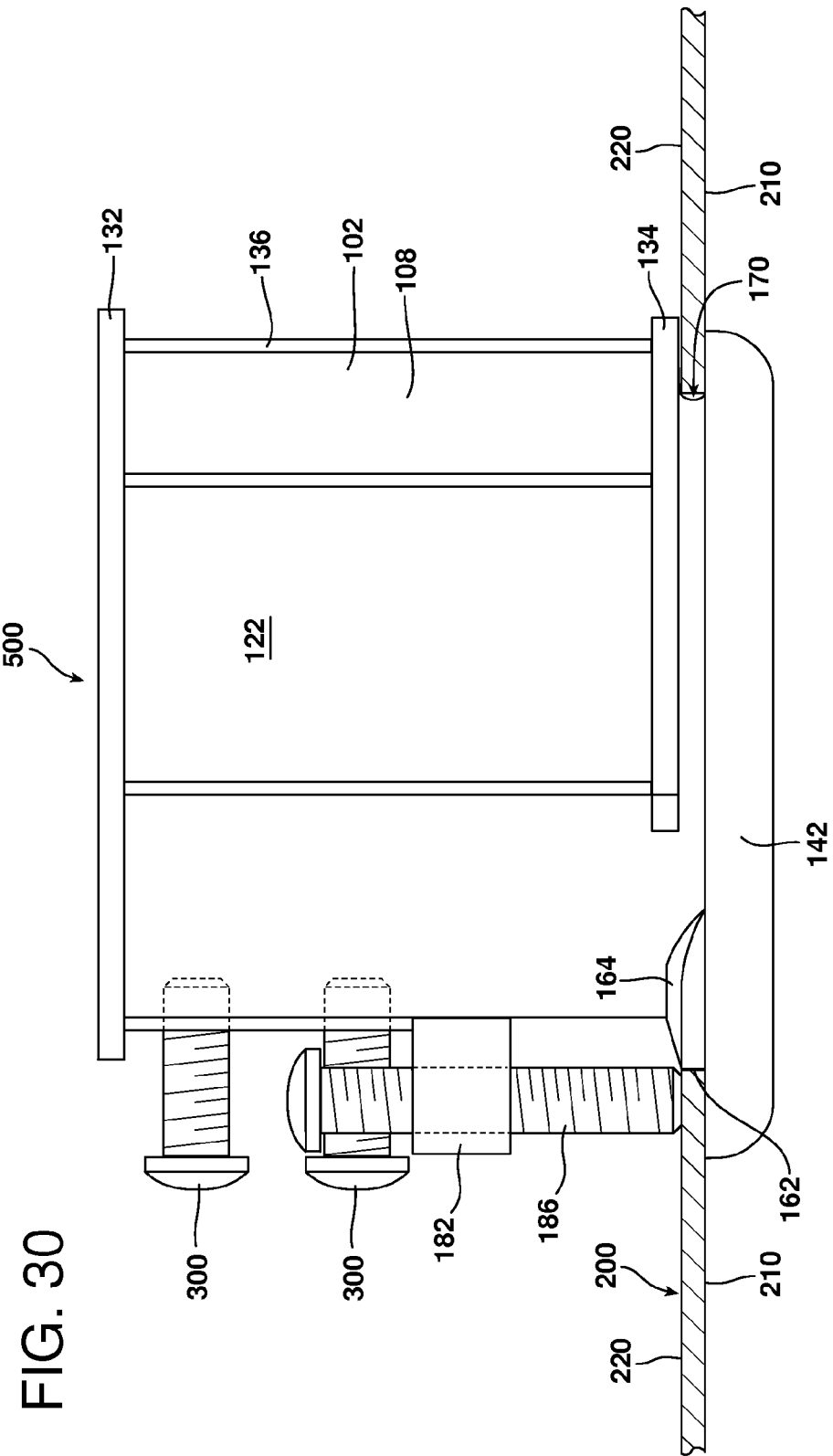

FIG. 30 is a side, partial cross-sectional view of the electrical connector of FIG. 27 secured to the junction box.

Figure 31:
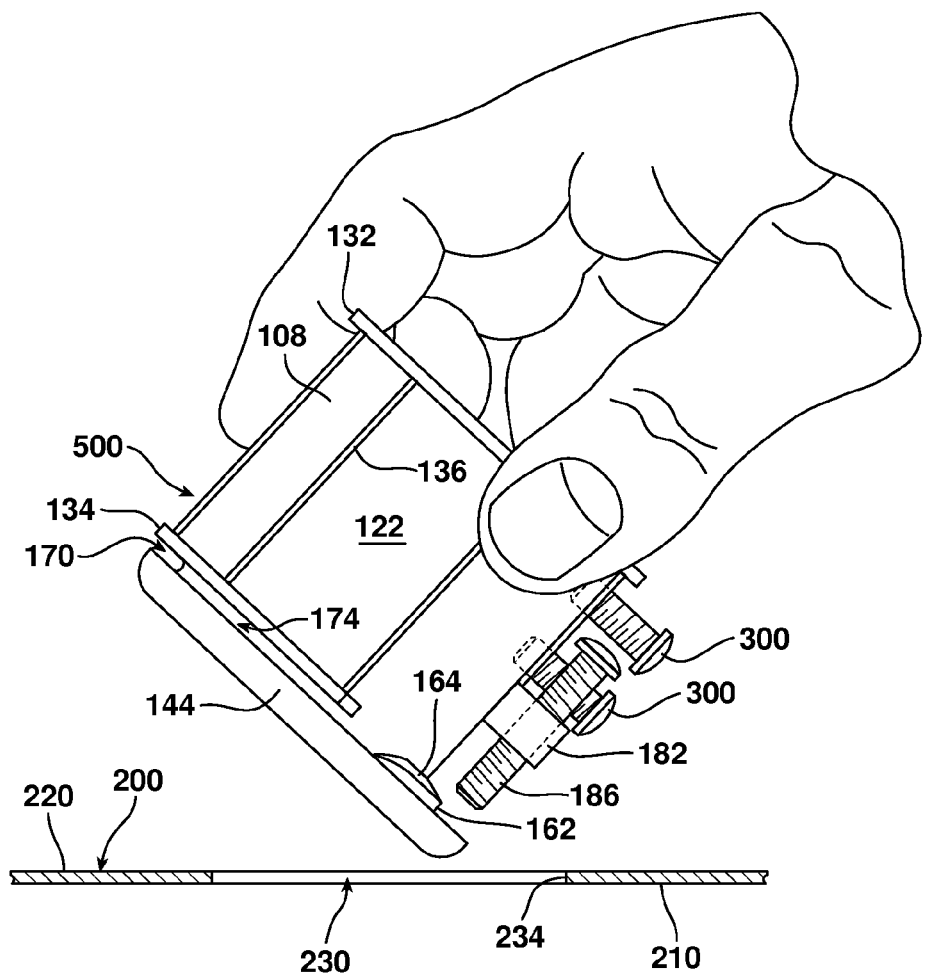

FIG. 31 is a side, partial cross sectional view showing the electrical connector of FIG. 27 partially assembled to a junction box.

Figure 32:
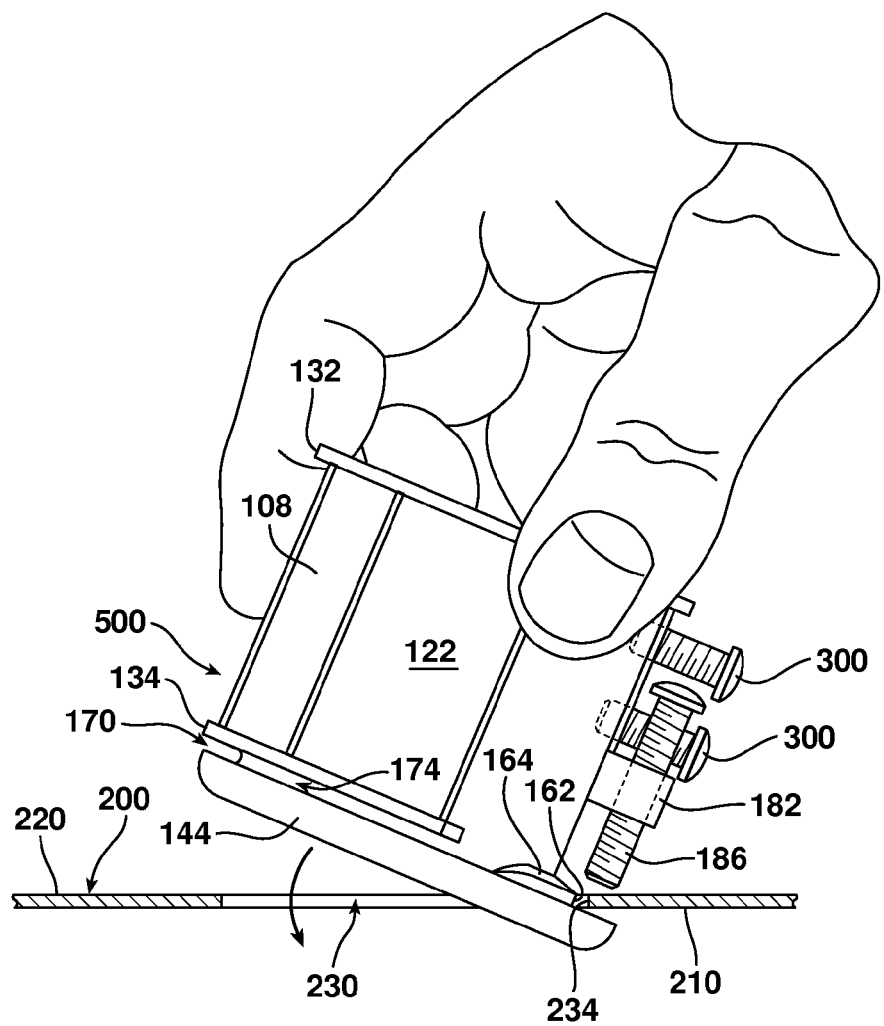

FIG. 32 is a side, partial cross sectional view showing the electrical connector of FIG. 27 further assembled to a junction box.

Figure 33:
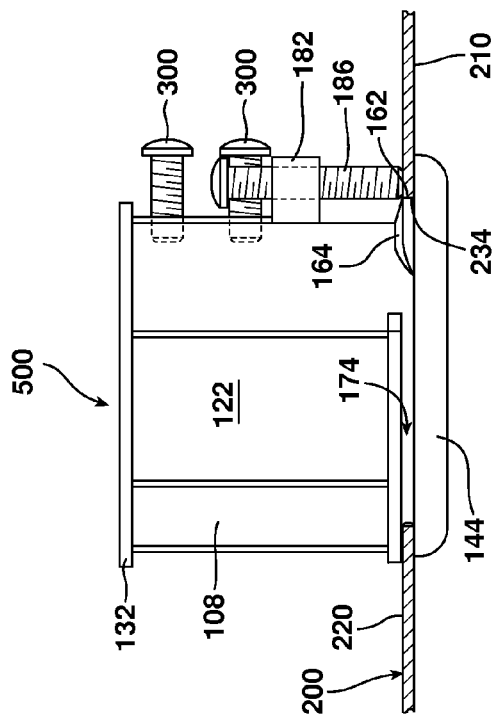

FIG. 33 is a side, partial cross sectional view showing the electrical connector of FIG. 27 assembled to and being secured to the junction box.

Figure 34:
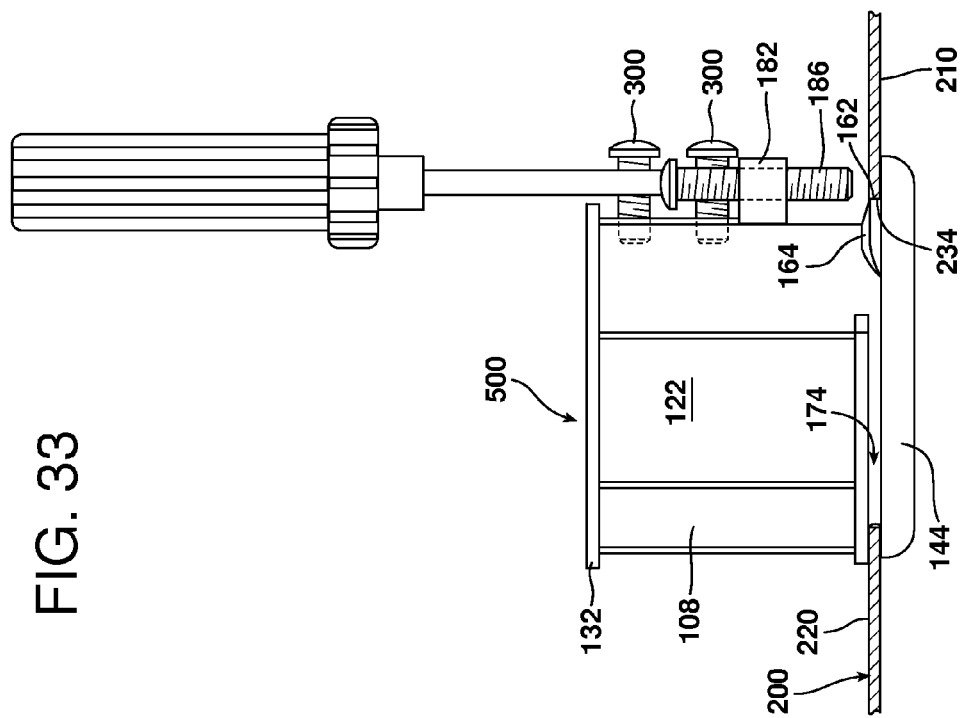

FIG. 34 is a side, partial cross sectional view showing the electrical connector of FIG. 27 assembled to and secured to the junction box.

Eighth Embodiment

Figure 35:
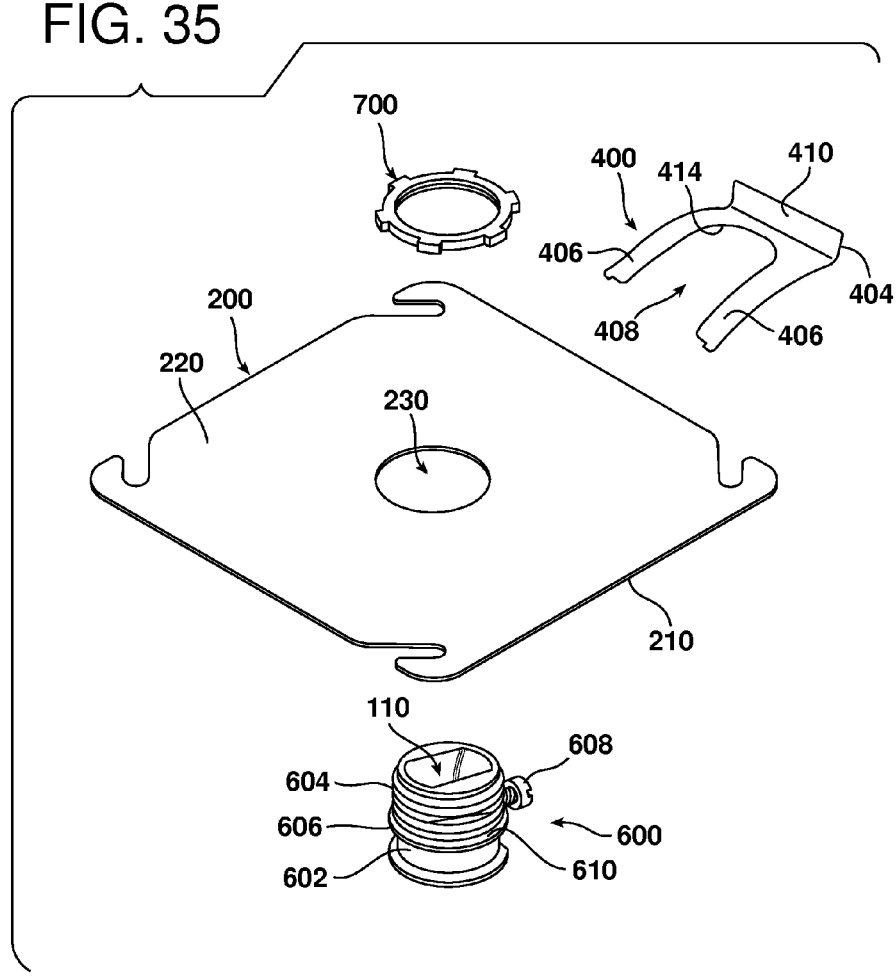

FIG. 35 is an exploded perspective view of a cover plate for an electrical junction box and another embodiment, an eighth embodiment, of the electrical connector of this invention.

FIG. 36 is a side, partial cross sectional view showing the electrical connector of FIG. 35 partially assembled and secured to the junction box side plate.

FIG. 37 is a side, partial cross sectional view showing the electrical connector of FIG. 35 fully assembled and secured to the junction box side plate.

Figure 38:
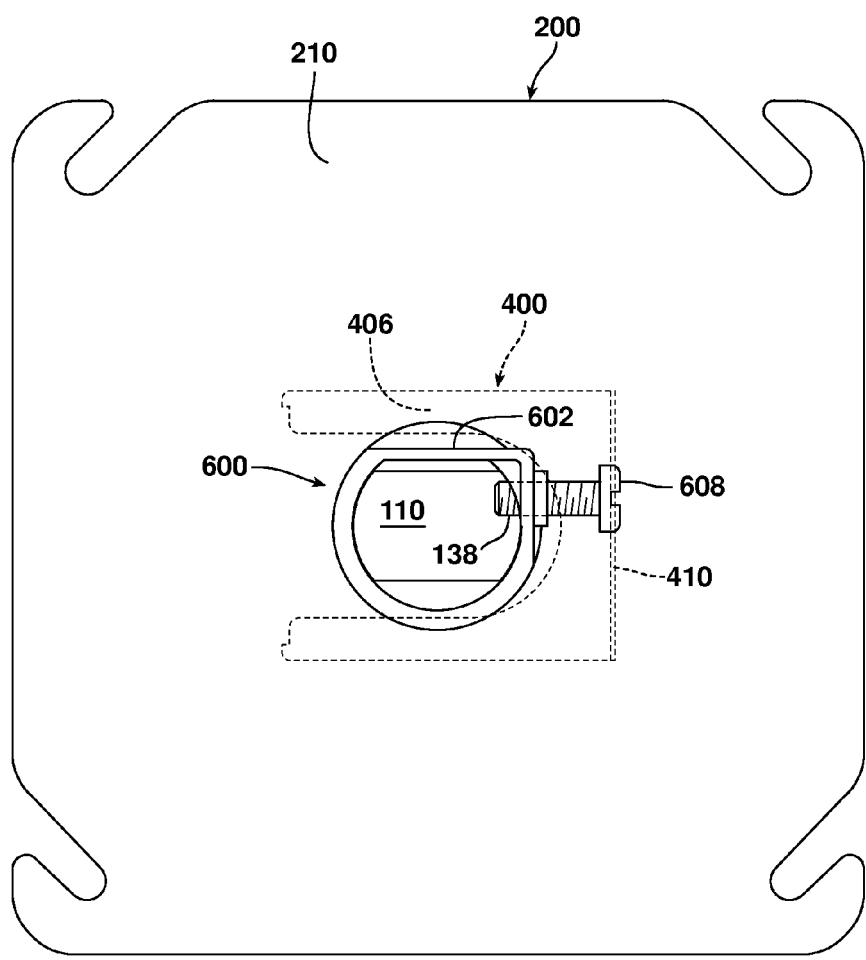

FIG. 38 is a plan view of one side of the cover plate for the electrical junction box having secured thereto the electrical connector depicted in FIG. 35.

Figure 39:
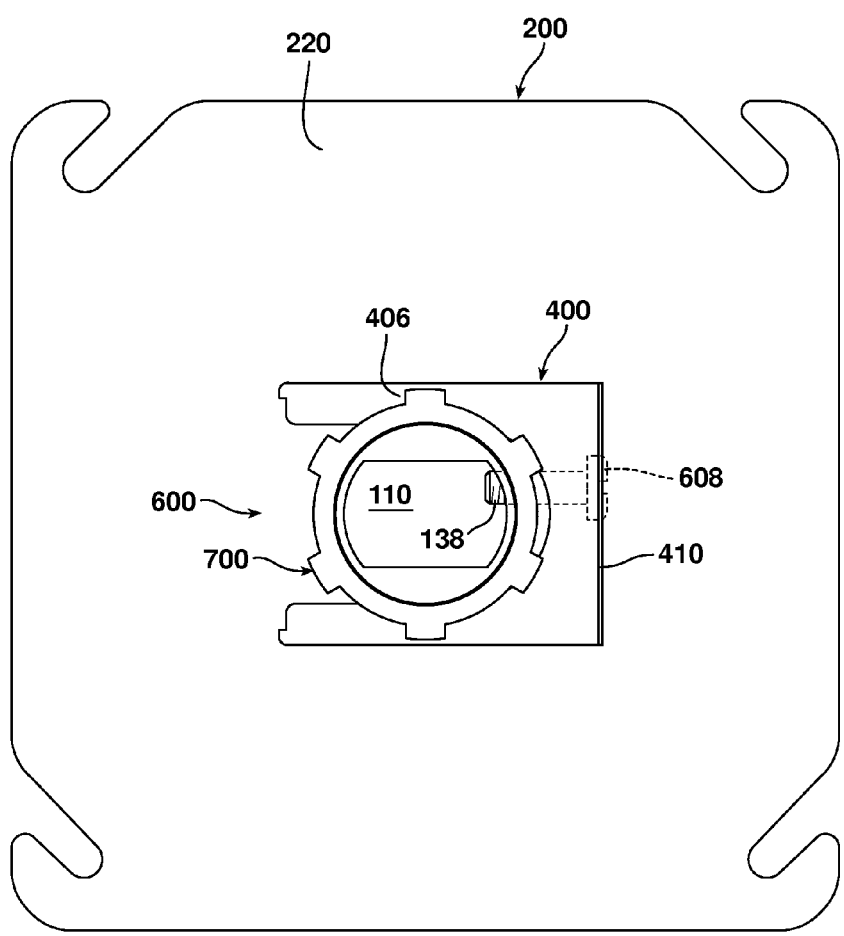

FIG. 39 is a plan view of the other side of the cover plate for the electrical junction box having secured thereto the electrical connector depicted in FIG. 35.

Ninth Embodiment

Figure 40:
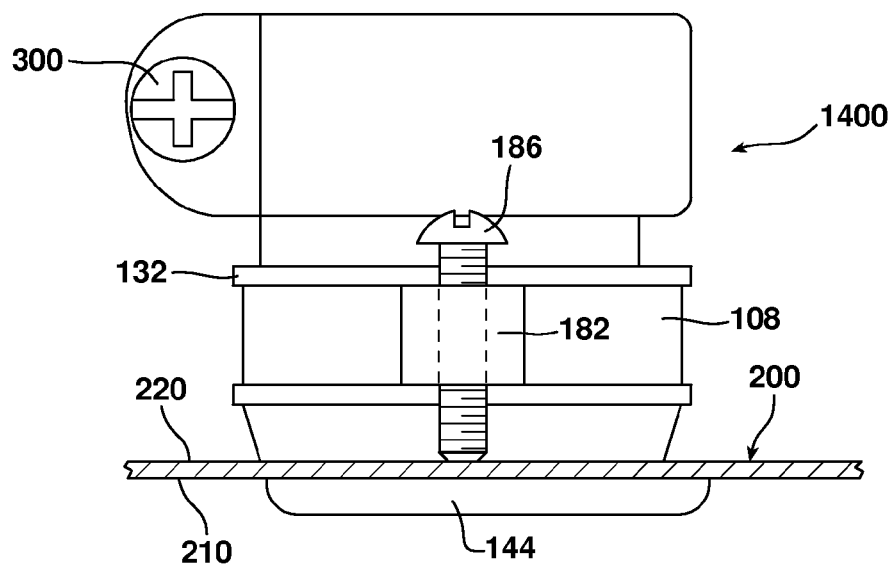

FIG. 40 is a side, partial cross-sectional view of an alternative embodiment, i.e., a ninth embodiment, of the electrical connector of this invention secured to a junction box.

Tenth Embodiment

Figure 41:
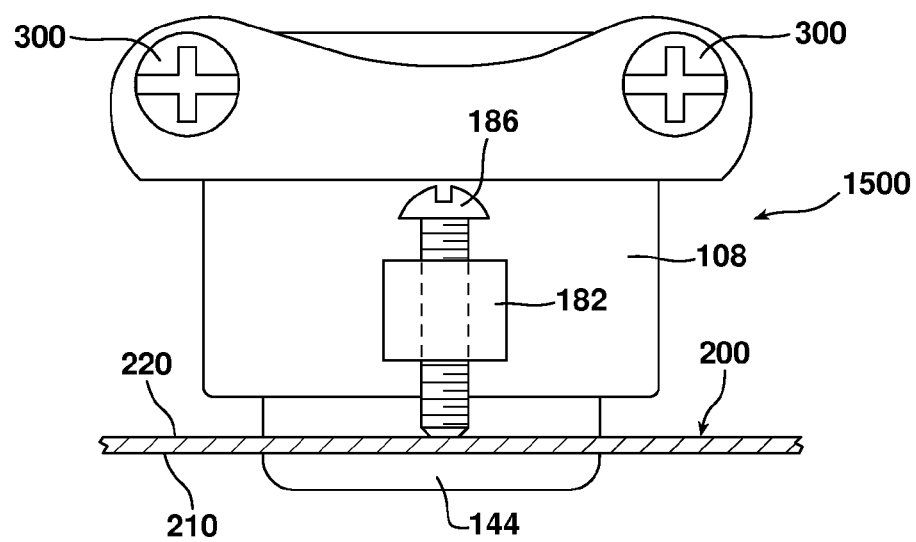

FIG. 41 is a side, partial cross-sectional view of an alternative embodiment, i.e., a tenth embodiment, of the electrical connector of this invention.

Eleventh Embodiment

Figure 42:
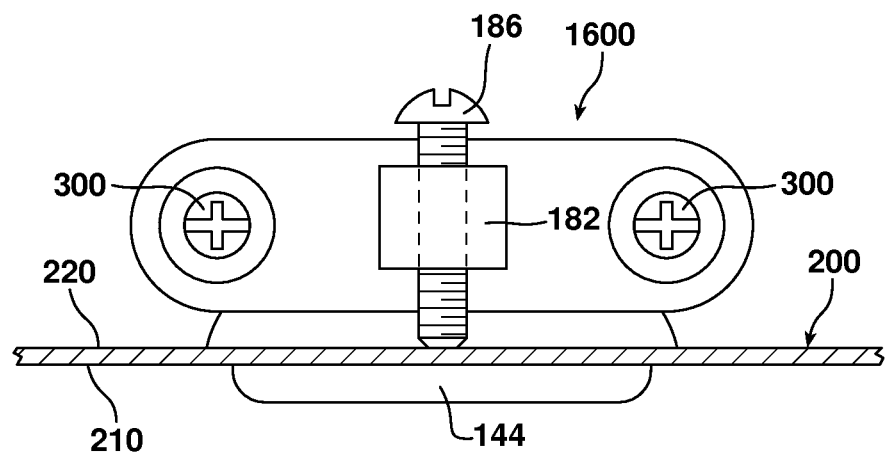

FIG. 42 is a side, partial cross-sectional view of an alternative embodiment, i.e., an eleventh embodiment, of the electrical connector of this invention.

Twelfth Embodiment

Figure 43:
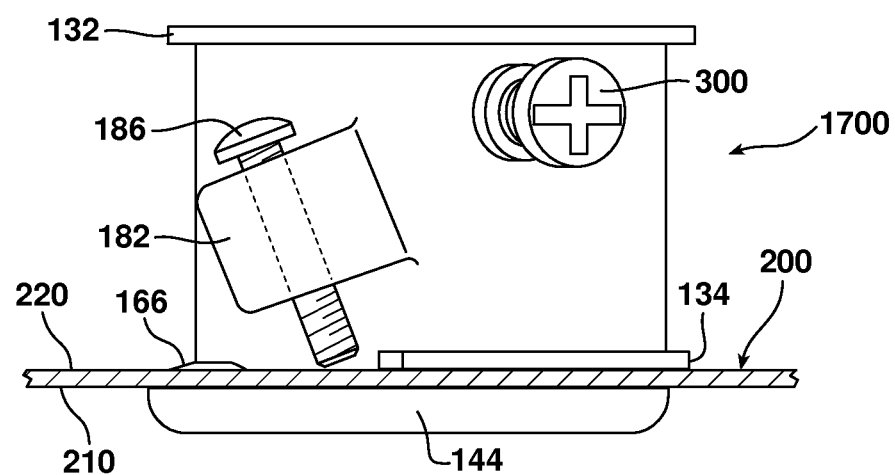

FIG. 43 is a side, partial cross-sectional view an alternative embodiment, i.e., a twelfth embodiment, of the electrical connector of this invention.

DETAILED DESCRIPTION

It is to be understood that each of the embodiments described herein may have many alternative variations and configurations. It is also to be understood that the specific components, devices, and features illustrated in the accompanying figures, described herein are merely exemplary, and should not be considered as limiting.

First Embodiment

The various embodiments as described herein may be used in connecting a plurality of types of conduits, including fluid conduits, cables, and other electrical conductors to a wide variety of pipes, junction boxes and other electrical enclosures.

As used in this disclosure, the term "electrical conduit" and like terms is not limited to standard rigid electrical conduit, but is intended to encompass any type of conduit, any type of cable, or any other type of electrical conductor. Likewise, the term "junction box" as used herein encompasses any type of electrical enclosure to which one or more electrical conduits are secured. Typically, they pass through holes or openings in the junction box, which are termed "knockout" holes or openings.

Figure 10:
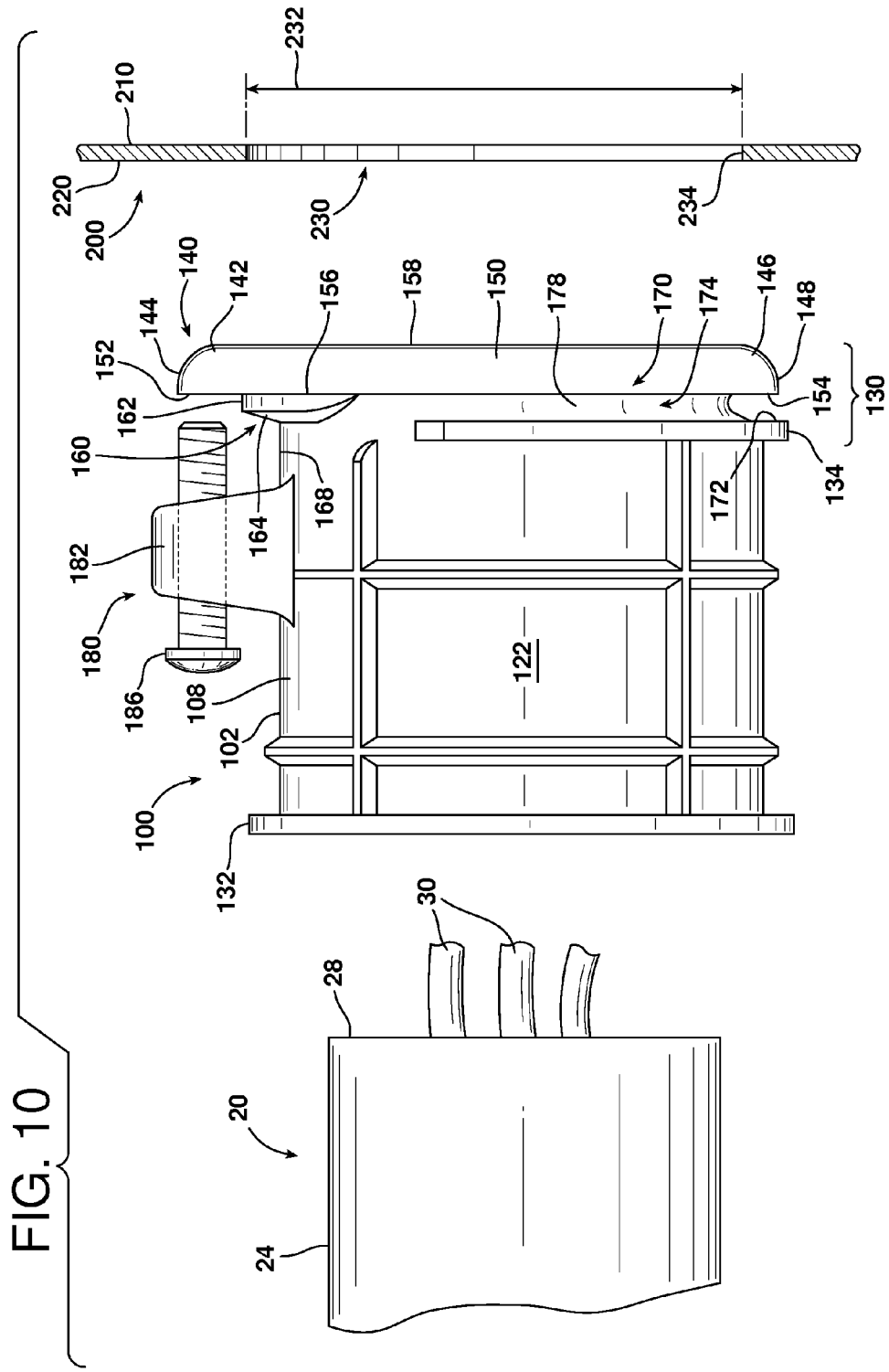
FIG. 10 is an exploded, partial cross sectional view showing the electrical connector of FIG. 1 with a portion of a junction box and an electrical conduit.

Referring for example to FIG. 10, an electrical connector 100 is provided that connects to a junction box 200. The electrical connector 100 is adapted to quickly, safely, and rigidly connect an electrical conduit 20 to a termination point within the junction box 200. The use of the term junction box 200 is meant to include many types of electrical enclosures, for example, outlet and fixture boxes, enclosures for disconnect switches and motor starters, and transformer enclosures, and other type of electrical enclosures. The junction box 200 is typically made from steel, plastic, or other well-known industry acceptable materials.

Referring to FIGS. 1-13, and in particular FIGS. 10-13, the junction box 200 has a junction box interior surface 210 and a junction box exterior surface 220. Typically, the junction box 200 has a plurality of prefabricated "knockout" holes 230, which are stamped or cut into the junction box 200. The knockout hole 230 is formed by removing a cover piece on the junction box 200 or, more typically, removing ("knocking out") a preformed perforated disc attached to the interior edge 234 defining the knockout hole 230. Some junction boxes 200 do not have such knockout holes 230 and the electrician must cut them into the junction box 200 wall. In this situation, knockout holes 230 are cut in the desired location with a punch and die set or by using other suitable hand tools. The knockout hole 230 has a knockout diameter 232 and a knockout hole interior edge 234.

Figure 9:
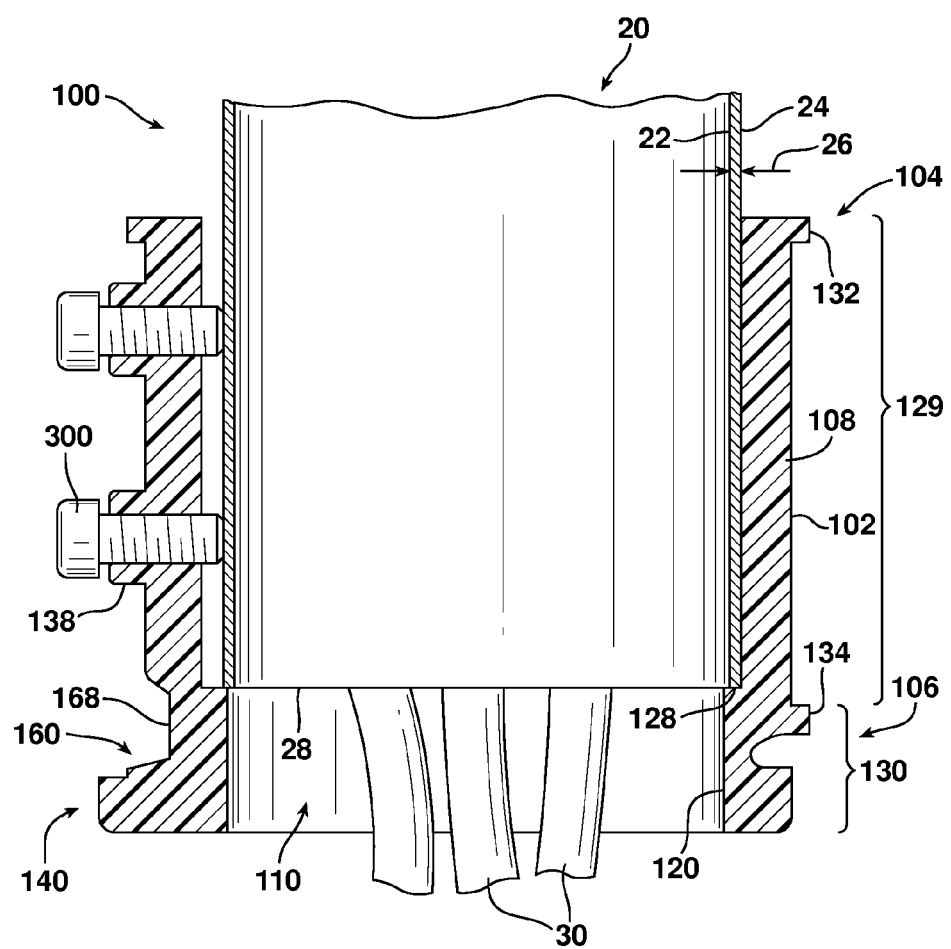
FIG. 9 is a cross sectional view taken along line 9-9 in FIG. 1 and further showing an electrical conduit secured in the electrical connector.

Referring to FIGS. 9 and 10, the electrical conduit 20 may be a rigid or flexible conduit or any type of hollow tubing commonly used in electrical applications. The electrical conduit 20 may be made from steel, plastic, or other industry acceptable material. The electrical conduit 20 has a conduit interior surface 22, a conduit exterior surface 24, a conduit thickness 26, a conduit leading edge 28, and may comprise individual exposed wires 30 to make suitable electrical connections within the junction box 200.

Figure 8:
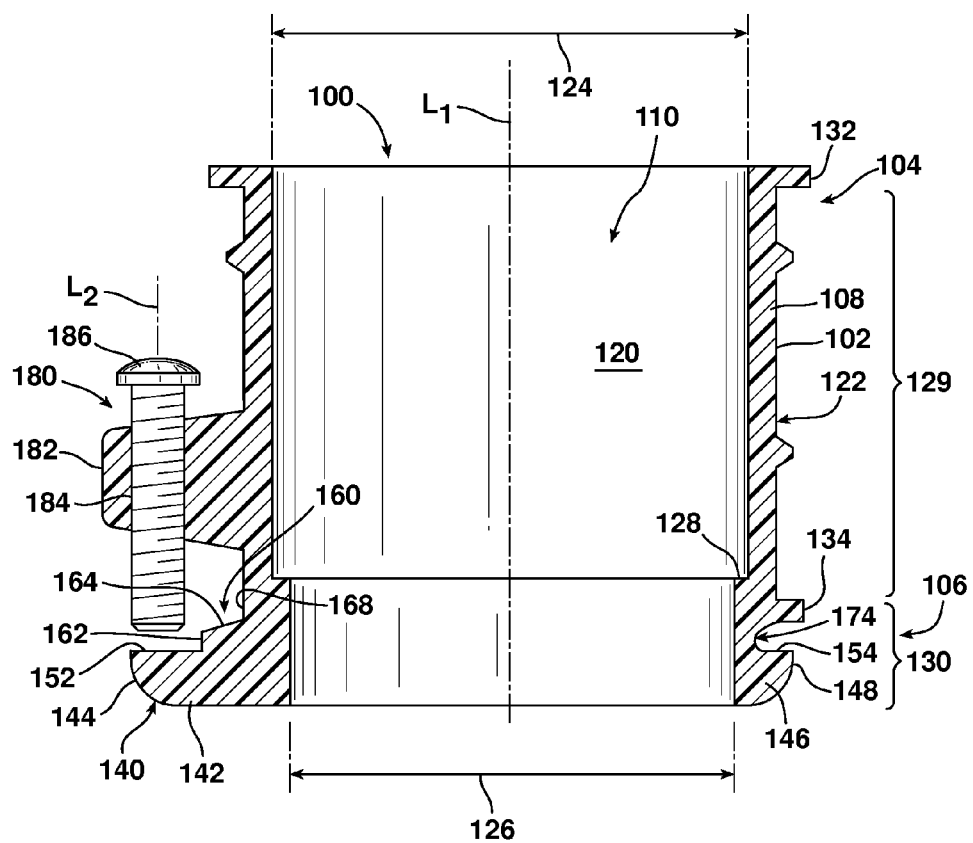
FIG. 8 is a cross sectional view taken along line 8-8 in FIG. 1.

Referring for example to FIGS. 1-13, the electrical connector system 100 includes a connector body 102 a pressure lock mechanism 180 for securing the connector body 102 to the junction box 200, see FIGS. 10-13, and typically, one or more conduit securing fasteners 300 for securing the electrical conduit 20 within the connector body 102. The connector body 102 has a proximal end 104, a distal end 106, and a sidewall 108 extending between the proximal and distal ends 104, 106, to define a conduit-supporting passageway 110 having a central axis L1. The sidewall 108 of the connector body 102 includes a body interior surface 120 and a body exterior surface 122. Referring to FIG. 8, the body interior surface 120 defines a proximal diameter 124 and a distal diameter 126. In the illustrated embodiment, the proximal diameter 124 is coaxial with the distal diameter 126 along central axis L1 of conduit supporting passageway 110. In the embodiment illustrated in FIG. 8, the distal diameter 126 is smaller than the proximal diameter 124 so that a circumferential conduit stop 128 is formed in the conduit-supporting passageway 110 that projects inward from the body interior surface 120. Referring to FIG. 9, the conduit stop 128 limits the distance that the conduit leading edge 28 can extend into the connector body 120.

The connector body 102, may be formed from a variety of materials suitable for the environment in which it is used and manufacturing capabilities, including, but not limited to, zinc, plastic, steel, brass, aluminum, and iron, copper, die cast materials or a combination thereof. In addition, and depending on the type of material, the connector body 102 may be produced by casting, pressing, machining from stock, injection molding, or manufactured by other common processes utilized for manufacturing electrical connectors. The connector body 102 may be custom designed for the particular electrical system, or can be produced as a "commodity" suitable for use in many different type electrical systems. The connector body 102, viewing it along axis L1 (e.g., FIG. 2) may be any cross-sectional shape suitable for use, e.g., round, square, rectangle, hexagonal or any other polygonal shapes.

Referring for example to FIGS. 8, 9 and 23, the connector body 102 may be considered to comprise a proximal conduit engaging portion 129 generally formed by a portion of the sidewall 108 proximal of the conduit stop 128 (e.g., the portions of the body interior surface 120 comprising at least the larger proximal diameter 124) and a junction box engaging portion 130 formed generally at the distal end 106 of the connector body 102. The connector body 102 may have a proximal flange 132 and a distal flange 134, each extending fully or partially around the perimeter or circumference of the sidewall 108 of the connector body 102, While a generally cylindrical shape is most common for the connector body 102, it will be clear, as indicated previously, that at least the conduit proximal engaging region or portion 129 of the connector body 102 may exhibit other shapes if desired, e.g., round, square, rectangle, hexagonal or any other polygonal shapes. However, the junction box engaging portion 130 should be generally a cylindrical shape to cooperate with traditionally circular-shaped knockout holes 230.

Referring to FIGS. 1-26, the sidewall 108 of the connector body 102 may have reinforcing ribs 136 formed on the body exterior surface 122 and may further comprise mounting bushings 138, for example, threaded bushings 138 to accept the securing fasteners 300, for example, threaded bolts, that are used to secure the electrical conduit 20 within the connector body 102 in a conventional manner, e.g. see FIG. 9. The mounting bushings 138 may be integral with the connector body 102 or separate structures secured to suitable openings defined in the connector body 102.

Figure 11:
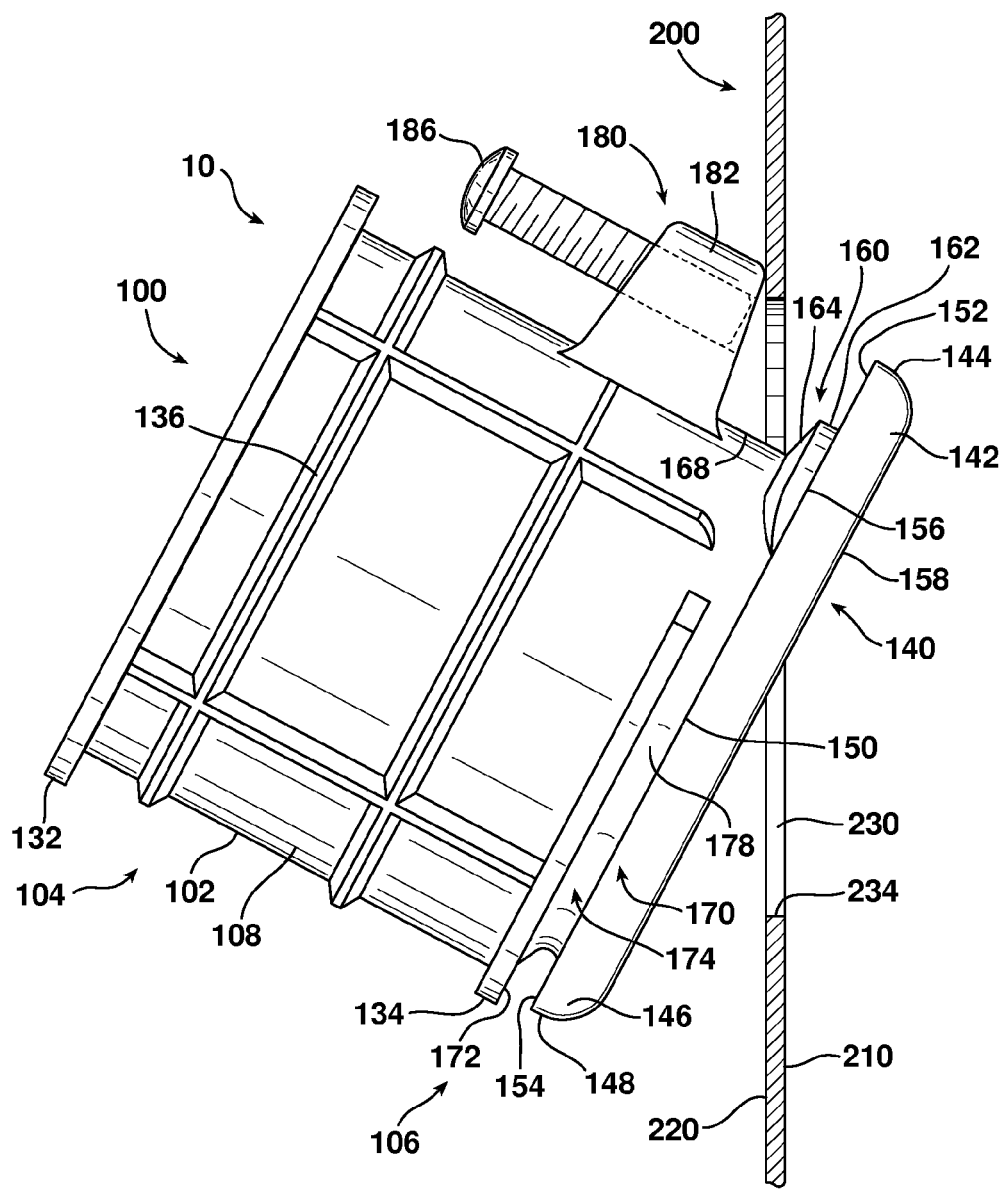
FIG. 11 is a side, partial cross sectional view showing the electrical connector of FIG. 1 partially assembled to a junction box.
Figure 12:
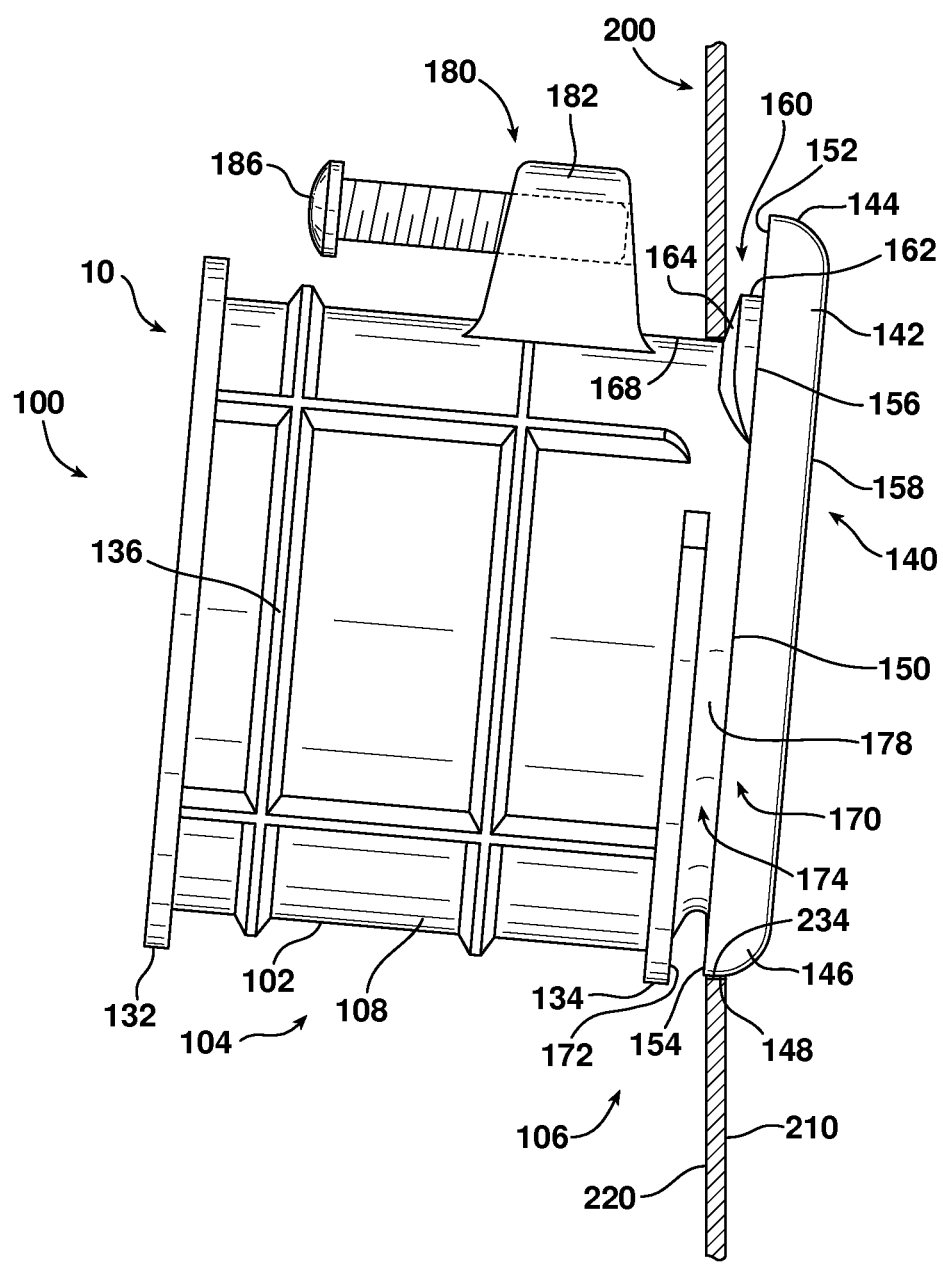
FIG. 12 is a side, partial cross sectional view showing further assembly of the electrical connector to the junction box as depicted in FIG. 11.
Figure 13:
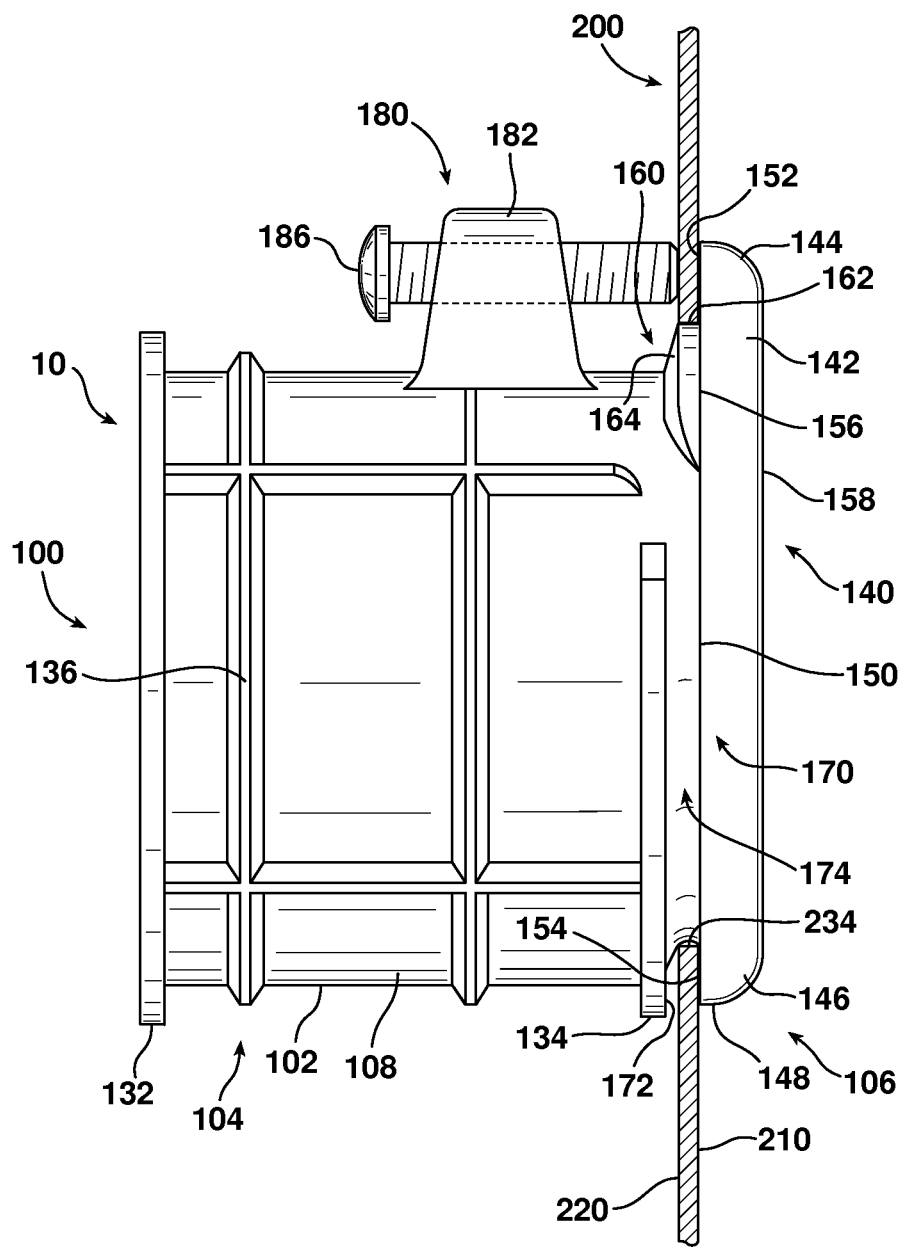
FIG. 13 is a side, partial cross sectional view showing final assembly of the electrical connector to the junction box as depicted in FIGS. 11-12.

Referring to the FIGS. 1-13, and in particular FIGS. 9 and 10, the junction box engaging portion 130 is formed at the distal end 106 of the connector body 102 and cooperates with the knockout hole 230, see FIGS. 11-13, to attach the connector body 102 to the junction box 200. The distal flange 134 is provided to aid in the installation process and mates against the exterior surface 220 of the junction box 200 during the installation process. Thus, the distal flange 134 may be considered part of the junction box engaging portion 130 of the connector body 102. However, as described herein, it is not necessary for the connector body 102 to have an outward extending distal flange 134 for seating against the exterior surface 220 of the junction box 200, as the connector body 102 may be simply formed with a distal "corner" or edge formed by the sidewall 108 for this purpose, as explained in detail herein.

Referring to FIGS. 11-13, the junction box engaging portion 130 generally comprises a foot portion 140, a locating edge 160, and a recessed locating collar 170. The foot portion 140 comprises a leading lug 142 defining a leading perimeter edge or wall 144, a trailing lug 146 defining a trailing perimeter edge or wall 148 and lateral walls 150 connecting the leading perimeter edge 144 and the trailing perimeter edge 148. The leading lug 142 and the trailing lug 146 define respective proximal facing seating surfaces 152, 154 that are generally planar in the illustrated embodiment. The respective lateral walls 150 each have a proximal edge 156 and a distal edge 158. The leading lug 142 generally projects outward past the sidewall 108 of the connector body 102 to oppose the pressure lock mechanism 180, while the trailing perimeter edge 148 of the trailing lug 146 may extend even with or just past the sidewall 108 of the connector body 102. Referring to FIGS. 3, 5, 6, 8, 11-13 reveals, the perimeter edge 148 of the trailing lug 146 is substantially semi-circular shaped and the lateral walls 150 generally taper at a small angle toward the leading lug 142 which has a generally arcuate-shaped leading perimeter edge or wall, i.e., a leading lug seating surface 144.

The locating edge 160 is formed on the leading lug-seating surface 144 and defines a leading locating surface 162 and a proximal facing locating surface 164. The proximal facing locating surface 164 generally slopes or tapers from a central high point 166 to the proximal edge 156 of the respective lateral walls 150 of the foot portion 140. The locating edge 160 is desirably formed coextensively with the sidewall 108 of the connector body 102 to extend outward from the body exterior surface 122 of the sidewall 108 of the connector body 102.

Referring to FIGS. 11-13, the connector body 102 defines a leading engagement surface 168 immediately proximal of the leading locating edge 160. In particular, in the present embodiment, the body exterior surface 122 of the sidewall 108 defines the leading engagement surface 168 immediately proximal of the leading locating ledge 160.

Referring to FIGS. 6, 7, 11-13, the distal flange 134 does not extend fully around the perimeter or circumference of the sidewall 108 but tapers inward to become flush with the leading engagement surface 168 of the connector body 102 on the leading side of the sidewall 168.

Still referring to FIGS. 6, 7, 11-13, the locating collar 170 is formed adjacent to and proximal of the trailing lug 146 so as to be positioned between a distal facing bearing surface 172 defined by the distal flange 134 extending outward from the sidewall 108 of the connector body 102 and the trailing lug 146. The locating collar 170 defines a recessed trailing locating surface 174 that may extend fully, or, desirably as illustrated, partially about the perimeter or circumference at the distal end 106 of the connector body 102 between the distal flange 134 and the trailing lug 146.

Figure 6:
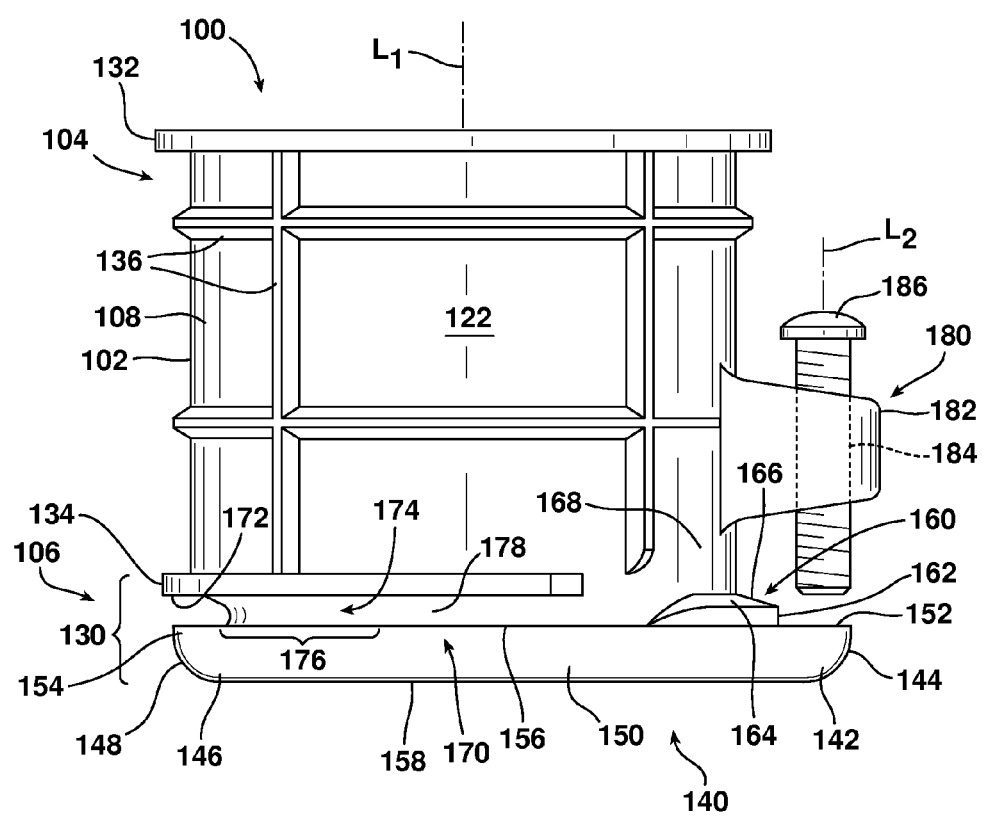
FIG. 6 is a right side view of the electrical connector depicted in FIG. 1.
Figure 7:
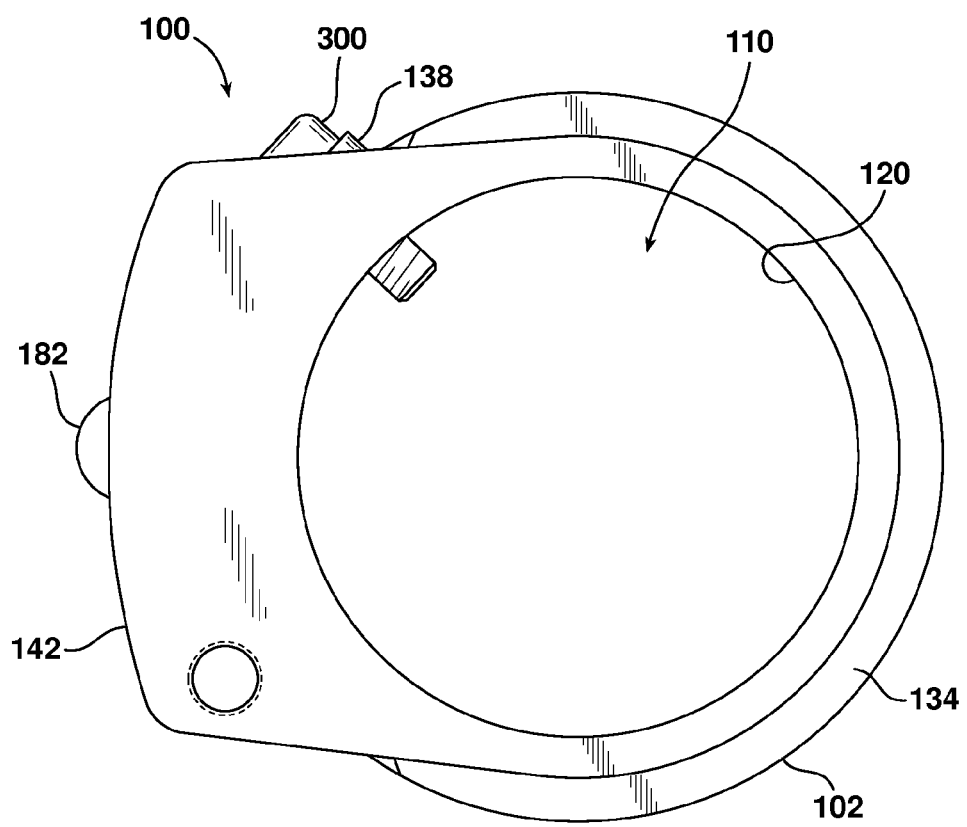
FIG. 7 is a bottom view of the electrical connector depicted in FIG. 1.

Referring for example to FIG. 6, the recessed trailing locating surface 174 may extend around the trailing perimetrical or circumferential portion 176 of the distal end 106 of the connector body 102 so as to terminate at the lateral walls of the 150 of the foot portion 140. Accordingly, the lateral walls 150 may extend proximally to the distal flange 134 adjacent terminal ends 178 of the trailing locating surface 174.

While it is desirably for the distal flange 134 to be present to form the distal facing bearing surface 172, the distal flange 134 may be omitted, as described previously, so that the sidewall 108 defines the surface 172. As noted previously, the connector body 102 may be simply formed with a distal "corner" or edge formed by the sidewall 108 which then defines the distal facing bearing surface 172 adjacent to the locating collar 170. The proximal flange 132 is likewise optional on the connector body 102.

Referring to FIGS. 1, 3, 4, 6, 8, 10-14, for example, the pressure lock mechanism 180 is used to removably secure the connector body 102 to the junction box 200. In the embodiment of FIGS. 1-13, particularly FIGS. 8, 10 and 13 the pressure lock mechanism 180 comprises a sleeve 182 extending outward from the body exterior surface 122 formed by the sidewall 108 of the connector body 102. The sleeve 182 may be integral with the sidewall 108 or be a separate structure that is joined to the sidewall 108 by conventional techniques such as mechanical fastening, adhesive fastening, and the like. The sleeve 182 defines a sleeve opening 184 (FIG. 8) which accepts a securing fastener 186 such as a threaded bolt. The sleeve 182 desirably extends outward from the sidewall 108 over the leading lug 142 so that a distal end 188 of the securing fastener 186 opposes the leading lug seating surface 144. The sleeve opening 184 may have a central axis L2 generally parallel to the central axis L1 of the conduit-supporting passageway 110. A similar pressure locking mechanism may be used in the context of securing a coupling to a pipe in a fluid conduit system.

Referring to FIGS. 11-13, depicts the assembly of the electrical connector 100 to the junction box 200. Initially, the installer tilts the connector body 102 so that the leading lug 142 is pointed into the knockout hole 230. The leading lug 142 is then inserted into the knockout hole 230 so that the leading perimeter edge 144 of the leading lug 142 extends into the knockout hole 230 wherein the leading lug seating surface 152 and the locating edge 160 entirely pass through the knockout hole 230 as shown in FIG. 11. The connector body 102 is then urged forwardly in the knockout hole 230 until the leading engagement surface 168 of the connector body 102, which is immediately proximal of the locating edge 160, contacts the knockout hole interior edge 234, as shown in FIG. 12. Next, the connector body 102 is pivoted into the knockout hole 230 so that the trailing lug 146 passes through the knockout hole 230. Once the trailing lug 146 passes the through the knockout hole 230, the locating collar 170 may be aligned so that the trailing locating surface 174 opposes the knockout hole interior edge 234. The connector body 102 may then be slid backward until the trailing locating surface 174 engages the knockout hole interior edge 234.

This sliding backward movement of the connector body 102 and the resulting engagement of the trailing locating surface 174 with the knockout hole interior edge 234 allows the installer to pivot the connector body 102 so that the locating edge 160 pivots upward and seats within the knockout hole 230 in the orientation shown in FIG. 13. In this orientation, the leading locating surface 162 on the locating ledge 160 abuts the knockout hole interior edge 234 and, further, the trailing locating surface 174 remains engaged against the knockout hole interior edge 234. It will be clear that, the tapered or sloped and proximal facing locating surface 164 of the locating ledge 160 provides sufficient clearance to allow the locating ledge 160 to pass upward through the knockout hole 230 in the upward pivoting movement of the connector body 102 as just described.

Still referring to FIG. 13, after fully seating the connector 100 the junction box engaging portion 130 of the connector body 102 is seated in the knockout hole 230, the proximal facing leading lug seating surface 152 and the proximal facing trailing lug seating surface 154 are seated against the interior surface 210 of the junction box 200. The installer then holds the connector body 102 engaged in the knockout hole 230 in the orientation shown in FIG. 13 and fixes/secures the position of the electrical connector 100 relative to the junction box 200 by use of the pressure lock mechanism 180. In the embodiment depicted, the electrical connector 100 is fixed relative to the junction box 200 by rotating the securing fastener 186, a threaded bolt, so that the distal end 188 of the securing fastener 186 (FIGS. 1 and 14) abuts against the exterior surface 220 of the junction box 200. The securing fastener 186 is tightened until sufficient pressure is applied against the exterior surface 220 of the junction box 200 to draw the proximal facing leading lug seating surface 152 and the proximal facing trailing lug seating surface 154 tightly against the interior surface 210 of the junction box 200 with sufficient force to prevent the dislodgement of the connector body 102 from the knockout hole 230.

As the securing fastener 186 is tightened against the exterior surface 220 of the junction box 200, a clearance space is fixed between the distal facing clearing surface 172 on the distal flange 134 and the exterior surface 220 of the junction box 200. The distal flange 134 is optional and merely provided as guidance for the installer in setting the trailing lug 146 in the knockout hole 230 and in seating the trailing locating surface 174 with the knockout hole interior edge 234, which then allows the installer to pivot the connector body 102 so that the locating ledge 160 seats within the knockout hole 230.

Figure 14:
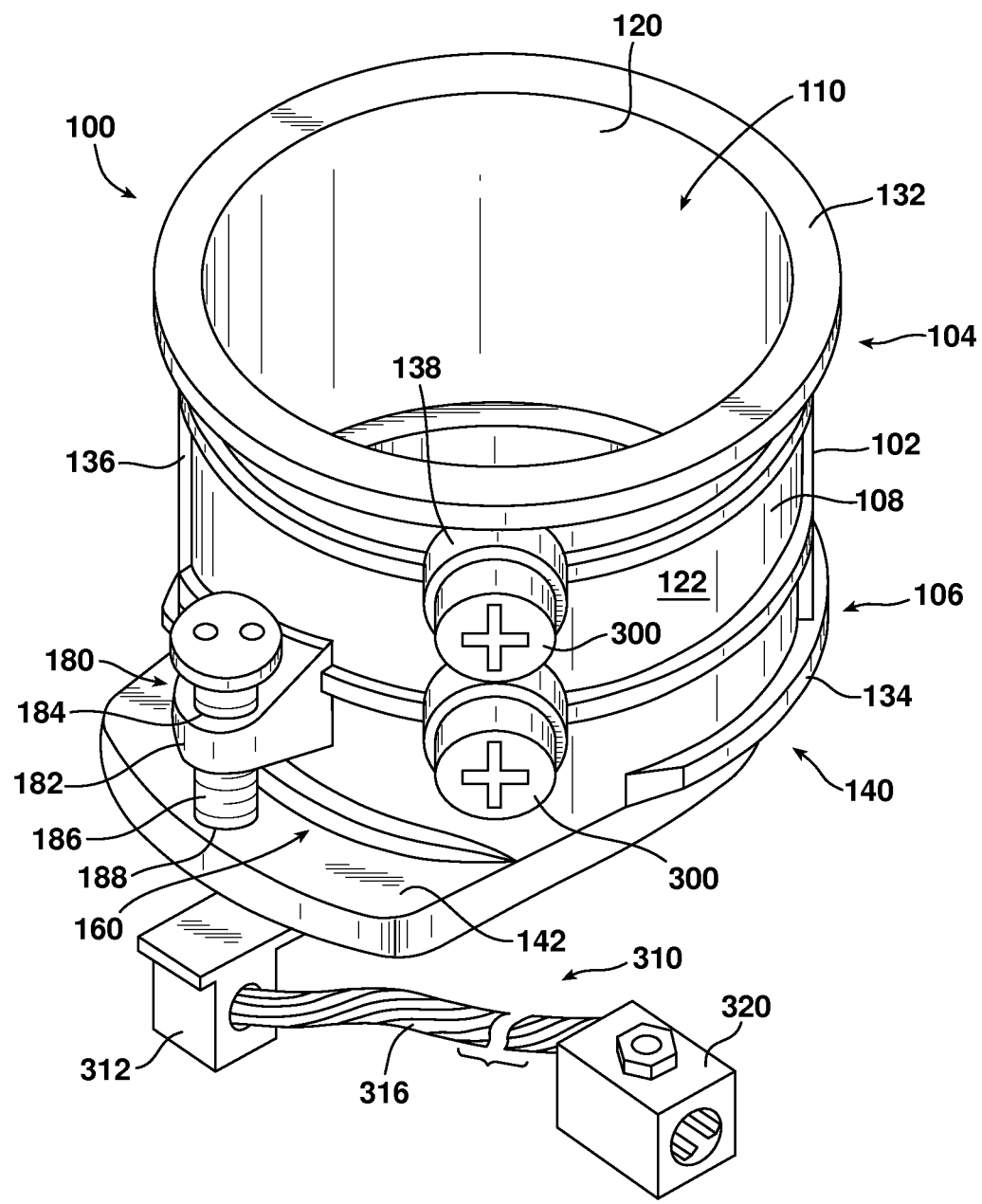
FIG. 14 is a perspective view of the electrical connector of FIG. 1 and further including an electrical ground.
Figure 15:
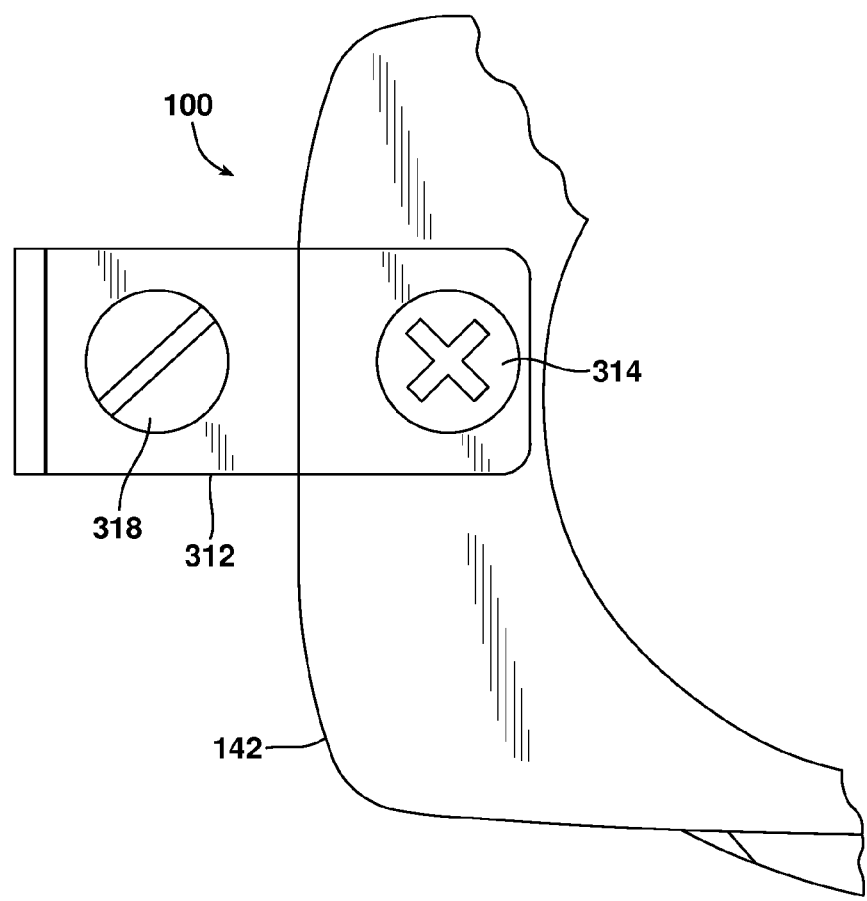
FIG. 15 is an underside view of a portion of the electrical connector of FIG. 14 showing attachment of the electrical ground to the electrical connector body.

In certain applications, it is desirable to electrically ground the connector body 102 of the electrical connector 100. FIGS. 14-15 illustrate a suitable grounding system 310 comprising a securing bracket 312 secured to the underside of the leading lug 142 by a mechanical fastener 314. A ground wire 316 is secured in the securing bracket 312 by a second mechanical fastener 318, which places the ground wire 316 in electrical connection with the connector body 102. A second securing bracket 320 may be attached to the opposing end of the ground wire 316 to electrically ground the connector body 102 according to known methods in the electrical field.

Second Embodiment

FIG. 16 is a front, partial cross-sectional view of another embodiment, i.e., a second embodiment, of the electrical connector 100 of this invention prior to locking the electrical connector 100 to a junction box 200, having a pressure lock mechanism 190 in the form of a securing cam arm 192. FIG. 17 is a front, partial cross-sectional view of the electrical connector of FIG. 16 showing the securing cam arm 192 in a locked state, locking the electrical connector 106 to a junction box 200.

More specifically, the second embodiment illustrated in FIGS. 16 and 17 differs from the prior described first embodiment (FIGS. 1-15) in the specific pressure lock mechanism 190 used therein. The description of the electrical connector 100 in FIGS. 1-15 are equally applicable to the embodiment of the electrical connector 100 shown in FIGS. 16 and 17. In this second embodiment, the electrical connector 100 comprises a cam arm 192 pivotally secured to the sidewall 108 of the connector body 102 by a pivot pin 194.

The cam arm 192 includes a finger tab 196 for pivoting the cam arm 192 relative to the connector body 102 and defines a cam surface 198 for engaging the exterior surface 220 of the junction box 200.

Referring to the embodiment depicted in FIGS. 16 and 17, once the electrical connector 100 is initially joined to the junction box 200 in a manner similar to that shown in FIGS. 11-13, the connector body 102 is secured to the junction box 200 by pivoting the cam arm 192 using the finger tab 196 until the cam surface 198 engages the exterior surface 220 of the junction box 200. In this position, the cam arm 192 extends roughly parallel to the exterior surface of the junction box 200. As the cam arm 192 is rotated the cam surface 198 frictionally engages the exterior surface 220, and the proximal facing leading lug seating surface 152 and the proximal facing trailing lug seating surface 154 are drawn tightly against the interior surface 210 of the junction box 200 and with sufficient force to prevent the dislodgement of the connector body 102 from the knockout hole 230. The pressure lock mechanism 190 in FIGS. 16 and 17 accomplishes the same function as the pressure lock mechanism 180 utilized in the embodiment of the electrical connector 100 depicted in FIGS. 1-15, i.e., securely connecting the connector 100 in the knockout hole 230 of the junction box 200.

Third Embodiment

FIG. 18 is a front view of a modified embodiment, i.e., a third embodiment, of the electrical connector 100 of this invention that is similar to that depicted in FIGS. 1-13. In this embodiment, the locating collar 170 is modified so that the trailing locating surface 174 defined by recessed locating collar 170 extends circumferentially around the connector body 102 and tapers to generally become flush with the leading engagement surface 168 of the connector body 102. Accordingly, the locating collar 170 extends further around the circumference of the connector body 102 in this third embodiment than in the embodiment of the electrical connector 100 depicted in FIGS. 1-13, with the terminal ends 178 in FIGS. 11-13 of the trailing locating surface 174 tapering to become generally flush with the leading engagement surface 168 of the connector body 102. In this embodiment, while the pressure lock mechanism 180 depicted in FIG. 18 may be utilized to secure the electrical connector 100 to the junction box 200, a pressure lock mechanism 400 in the form of a securing spring clip 402 may also be used, as now discussed in connection with FIGS. 19-21.

Fourth Embodiment

FIG. 19 is an exploded, partial cross-sectional view, of the fourth embodiment of the electrical connector 100 having a pressure lock mechanism 400 in the form of a securing spring clip 402 for securing the electrical connector 100 to a junction box 200. FIGS. 20 and 20A are perspective views of two embodiments of the securing spring clip 402 used as the pressure lock mechanism 400 in the fourth embodiment of the electrical connector 100 of this invention. FIG. 21 is a side, partial cross-sectional view, of the fourth embodiment of the electrical connector 100 showing the securing spring clip 402 in position to secure the electrical connector 100 to the junction box 200.

As only the pressure lock mechanism 400 differs in FIGS. 19-21, the foregoing discussion regarding the other components of the electrical connector 100 are equally applicable to this fourth embodiment of the electrical connector 100, except as discussed herein. The pressure lock mechanism 400 in this fourth embodiment of the electrical connector 100 shown comprises a securing spring clip 402 having a body defined by flange portion 404 and two distally extending spring arms 406 defining a horseshoe shaped receiving space 408 encircling connector body 102 there between.

Referring for example to FIG. 19, the securing spring clip 402 has a flange portion 404 and an upstanding finger tab 410 for grasping for installation of the securing spring clip 402 onto to the electrical connector 100. The spring arms 406 (see FIGS. 20 and 20A) when viewed from the side (FIG. 19) are arcuate-shaped to define a camber in the respective spring arms 406 so the spring arms 406 function as semi-elliptical springs to secure to the connector 100 to the junction box 200. The spring arms 406 terminate in planar engaging ends 412. Additionally, the flange portion 404 of the securing spring clip 402 defines a curved edge 414 (FIGS. 20 & 20A) forming a horseshoe shaped receiving space 408 for engaging the locating ledge 160 of the junction box engaging portion 130 of the connector body 102. Accordingly, it is desirable for the curved edge 414 to have a mating curvature to that of the leading locating surface 162 of the locating edge 160.

FIG. 20A is a perspective view of another embodiment of the securing spring clip 402 used as the pressure lock mechanism 400 in the fourth embodiment of the electrical connector 100 of this invention, wherein a plurality tab projections 409 assist in securing the connector 100 to the junction box 200.

As noted, certain modifications are present in the connector body 102 of the electrical connector 100 of FIGS. 19-21 as compared to the embodiment of the electrical connector 100 in FIGS. 1-13. First, the pressure lock mechanism 400 with securing spring clip 402 replaces the pressure lock mechanism 180, outward extending sleeve 182 and associated securing fastener 186 in the embodiment of the electrical connector 100 shown in FIGS. 1-13. Additionally, the locating collar 170 is modified so that the recessed trailing locating surface 174 defined by the locating collar 170 extends circumferentially around the connector body 102 and tapers to generally become flush with the leading engagement surface 168 of the connector body 102. Accordingly, the locating collar 170 extends further around the circumference of the connector body 102 in this embodiment than in the embodiment depicted in FIGS. 1-13, with the terminal ends 178 of the trailing locating surface 174 tapering to become generally flush with the leading engagement surface 168 of the connector body 102.

To install the electrical connector 100 shown in FIGS. 19-21, once the electrical connector 100 is positioned in the knockout hole 230 of junction box 200 as described previously (see FIGS. 11-13). The connector body 102 is secured to the junction box 200 by placing the securing spring clip 402 on the exterior surface 220 of the junction box 200, aligning the horseshoe shaped receiving space 408 defined by the spring arms 406 and sliding it along the exterior surface 220 in the direction of arrow A1 to receive therein the connector body 102. As the securing spring clip 402 is slid towards the connector body 102, the engaging ends 412 of the spring arms 406 engage with the locating collar 170 to align the securing spring clip 402 relative to the connector body 102. Further movement of the securing spring clip 402 in the direction of arrow A1 causes the spring arms 406 to engage the locating collar 170 and be compressed by the recessed trailing locating surface 174 defined by locating collar 170 and the exterior surface 220 of the junction box 200. This compression reduces the camber of the spring arms 406, thereby causing the flange portion 404 of the securing spring clip 402 to exert pressure on the exterior surface 220 of the junction box 200 proximate the leading lug 142. This downward pressure on the exterior surface 220 of the junction box 200 draws the proximal facing leading lug seating surface 152 and the proximal facing trailing lug seating surface 154 tightly against the interior surface 210 of the junction box 200 with sufficient force to prevent dislodgement of the connector body 102 from the knockout hole 230.

Fifth Embodiment

Referring to FIGS. 22-25, a Fifth Embodiment of the electrical connector 100 is depicted. In this embodiment, the connector body 102 is modified so that the securing spring clip 402 is mounted on the connector body 102 from the interior side of the junction box 200. In this embodiment, the connector body 102 comprises a modified junction box engaging portion 430.

Referring for example to FIG. 23, in the present embodiment the junction box engaging portion 430 is formed by the distal flange 434 and a distal end portion 432 defining a recessed location collar 434. Locating collar 434 defines a recessed locating surface 436 that extends circumferentially around the distal end portion 432. As with previous embodiments, it is not necessary for the proximal conduit-engaging portion 129 of the connector body 102 to be a cylindrical shape, it may be symmetrical or nonsymmetrical and any polygonal shape, while the end portion 432 should be generally cylindrical in shape to cooperate with widely used circular shaped knockout holes 230.

Installation of the electrical connector 100 to the junction box 200 according to this embodiment is generally shown in FIGS. 24-25. The electrical connector 100 is initially joined to the junction box 200 by inserting the end portion 432 of the connector body 102 through the knockout hole 230 so that the distal facing bearing surface 172 of the distal flange 134 contacts the interior surface 210 of the junction box 200. This places the locating collar 434, defining the recessed locating surface 436, within the junction box 200 and exposes the recessed locating surface 436 for engagement by the securing spring clip 402. Referring to FIGS. 24-25, the connector body 102 is secured to the junction box 200 by placing the securing spring clip 402 in the vicinity of the interior surface 210 of the junction box 200 and generally aligning the horse shoe shaped receiving space 408, defined by the spring arms 406 of the securing spring clip 402 in a position to receive the connector body 102.

As shown in FIGS. 24 and 24A, the connector body 102 is held in place in the knockout hole 230 while sliding the securing spring clip 402 toward the connector body 102 in the direction of arrow A2. FIG. 24 B is a plan view of another embodiment of the securing spring clip used in FIG. 24 A. to secure the electrical connector 100 to the junction box 200.

As the securing spring clip 402 is slid towards the connector body 102, the engaging ends 412 of the spring arms 406 engage with the locating collar 434 to align the securing spring clip 402 relative to the connector body 102. Further movement of the securing spring clip 402 in the direction of arrow A2 causes the spring arms 406 to engage the locating collar 434 and, further, to be compressed between the recessed locating surface 436 defined by the locating collar 434 and the interior surface 210 of the junction box 200. This compression reduces the camber of the spring arms 406 and thereby causing the flange portion 404 of the securing spring clip 402 to exert pressure on the interior surface 210. This downward pressure on the exterior surface 220 of the junction box 200 draws the distal facing bearing surface 172 of the distal flange 134 tightly against the exterior surface 220 of the junction box 200 with sufficient force to prevent the dislodgement of the connector body 102 from the knockout hole 230.

As depicted in FIGS. 24, 24A, the securing spring clip 402 used as the pressure lock mechanism 400 in this Fifth Embodiment of the electrical connector 100 of this invention, has a plurality tab projections 409 to assist in securing the connector 100 to the junction box 200. As the securing spring clip 402 is slid in the direction of arrow A2, it also causes the tab projections 409 to engage the interior surface 210 of the junction box 200 to further secure the electrical connector 100, the tab projections 409 being compressed between the recessed locating surface 436 defined by the locating collar 434 and the interior surface 210 of the junction box 200.

Sixth Embodiment

Figure 26B:
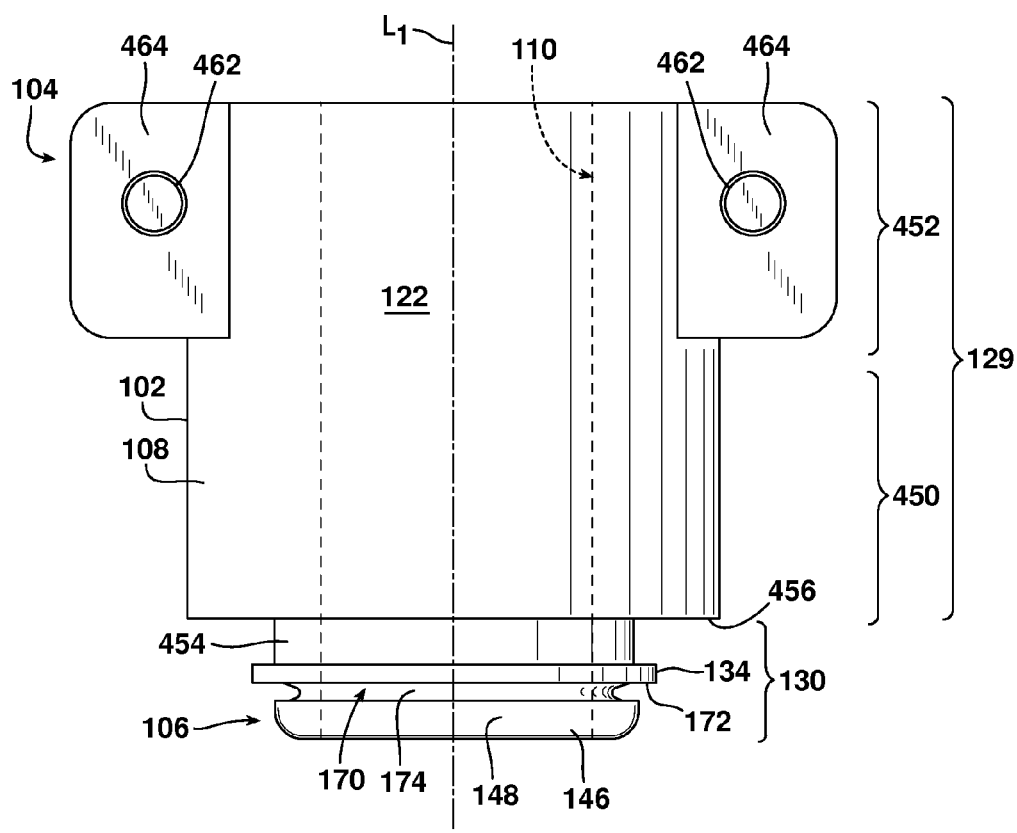

FIGS. 26, 26A and 26B are the front, side and rear views, respectively, of another embodiment, i.e., a sixth embodiment, of the electrical connector 100 of this invention. In this embodiment, the junction box engaging portion 130 of the connector body 102 has the same general configuration as the embodiment of the electrical connector 100 shown as well as the same pressure lock mechanism 180 in FIGS. 1-13 that functions in the same manner. Referring to FIGS. 26 and 26A, in this embodiment, the sleeve 182 extends outward from the sidewall 108 of the connector body 102 and secures the electrical connector 100 to the junction box in a similar manner to that described previously. However, still referring to FIGS. 26 and 26A, the connector body 102 defines a conduit-supporting passageway 110 that has a central axis L1 that is offset from a central axis L3 of the junction box engaging portion 130 of the connector body 102. The proximal conduit-engaging portion 129 of the connector body 102 is generally divided into a conduit-receiving portion 450 wherein the conduit-supporting passageway 110 is provided and a conduit-securing portion 452 for securing the electrical conduit in the conduit-supporting passageway 110. The sidewall 108 of the connector body 102 defines both portions 450, 452. Additionally, the connector body 102 also comprises, in this embodiment, a lower cylindrical portion 454 extending distally from the conduit-securing portion 452. The lower cylindrical portion 454 defines the leading engagement surface 168 immediately proximal of the leading locating ledge 160. This embodiment of the electrical connector 100 includes a distal shoulder 456 formed at a distal end 106 of the conduit securing portion 452, which is likewise a result of the axial offset between axis L1 and L3. The distal flange 134 is now defined on the portion of the connector body 102 forming the junction box engaging portion 130, namely, the lower cylindrical portion 454. The distal shoulder 456 defines the conduit stop 128 described previously. The conduit-securing portion 452 further supports a securing clamp 458, which is held to the conduit-securing portion 452 by a pair of securing fasteners 460. The securing fasteners 460 may be threaded bolts mated with threaded openings 462 in the conduit-securing portion 452. The threaded openings 462 may be formed in lateral flanges 464 formed as part of the conduit-securing portion 452.

Seventh Embodiment

FIGS. 27-34 are directed to a seventh embodiment of the electrical connector 500 of this invention. This embodiment functions similar to that described in FIGS. 1-13, and has substantially the same elements. For brevity, the elements are numbered consistent with FIGS. 1-13 and function in a like manner. However, the electrical connector 500 of this embodiment includes a connector body 102 having a dual pressure lock mechanism 180 for securing the connector body 102 to the junction box 200, with the dual conduit securing fasteners 300 there between.

Referring to FIGS. 27-34, the pressure lock mechanism 180 is used to removably secure the connector body 102 to the cover plate of the junction box 200. The pressure lock mechanism 180 comprises dual sleeves 182 extending outward from the body exterior surface 122 formed by the sidewall 108 of the connector body 102. The sleeves 182 may be integral with the sidewall 108 or separate structures joined to the sidewall 108 by conventional techniques such as mechanical fastening, adhesive fastening, and the like. The sleeves 182 include a sleeve opening each of which accepts a securing fastener 186 such as a threaded bolt. Each sleeve 182 desirably extends outward from the sidewall 108 over the leading lug 142 so that a distal end 188 of each securing fastener 186 opposes the leading lug seating surface 144. Each of the sleeves has a central axis that is generally parallel to the central axis L1 of the conduit-supporting passageway 110.

FIGS. 31-34 depict the assembly of the electrical connector 100 to the junction box 200. This is done in substantially the same manner as shown in FIGS. 11-13. Initially, the installer tilts the connector body 102 so that the leading lug 142 is pointed into the knockout hole 230. The leading lug 142 is then inserted into the knockout hole 230 so that the leading perimeter edge 144 of the leading lug 142 extends into the knockout hole 230 wherein the leading lug seating surface 152 and the locating edge 160 entirely pass through the knockout hole 230 as shown in FIG. 32. The connector body 102 is then urged forwardly in the knockout hole 230 until the leading engagement surface 168 of the connector body 102, which is immediately proximal of the locating edge 160, contacts the knockout hole interior edge 234, as shown in FIG. 32. Next, the connector body 102 is pivoted into the knockout hole 230 so that the trailing lug 146 passes through the knockout hole 230. Once the trailing lug 146 passes the through the knockout hole 230, the locating collar 170 may be aligned so that the trailing locating surface 174 opposes the knockout hole interior edge 234. The connector body 102 may then be slid backward until the trailing locating surface 174 engages the knockout hole interior edge 234.

This sliding backward movement of the connector body 102 and the resulting engagement of the trailing locating surface 174 with the knockout hole interior edge 234 allows the installer to pivot the connector body 102 so that the locating edge 160 pivots upward and seats within the knockout hole 230 in the orientation shown in FIG. 33. In this orientation, the leading locating surface 162 on the locating ledge 160 abuts the knockout hole interior edge 234 and, further, the trailing locating surface 174 remains engaged against the knockout hole interior edge 234.

Referring to FIG. 33, after fully seating the electrical connector 500, the installer holds the connector body 102 engaged in the knockout hole 230 in the orientation shown in FIG. 33 and fixes/secures the position of the electrical connector 100 relative to the junction box 200 by use of the pressure lock mechanism 180. In the embodiment depicted, the electrical connector 100 is fixed relative to the junction box 200 by rotating each of the securing fasteners 186, a threaded bolt, so that the distal end of each of the securing fasteners 186 (FIGS. 33 and 34) abuts against the exterior surface 220 of the junction box 200. Each of the securing fasteners 186 is tightened until sufficient pressure is applied against the exterior surface 220 of the junction box 200 to draw the proximal facing leading lug seating surface 152 and the proximal facing trailing lug seating surface 154 tightly against the interior surface 210 of the junction box 200 with sufficient force to prevent the dislodgement of the connector body 102 from the knockout hole 230.

Eighth Embodiment

FIGS. 35-39 depict the eighth embodiment of this invention. FIG. 35, is an exploded perspective view depicting the electrical connector 600 mounted in the knockout hole 230 on a cover plate of an electrical junction box 200. The components comprise the electrical connector body 602 having a threaded section 604, a threaded ring 700 that can be removably mounted to the threaded section 604 and the securing spring clip 400.

Referring to FIG. 36, the threaded section 604 is either screw threaded into or slipped through knockout hole 230 until lip 606 abuts against the exterior surface 220. The securing spring clip 400 is similar to that depicted in FIG. 20. The securing spring clip 400 has a flange portion 404 and an upstanding finger tab 410 for grasping for installation of the securing spring clip 400 onto to the threaded section 604 of the electrical connector body 602. The spring arms 406 when viewed from the side (FIGS. 36 and 37) are arcuate-shaped to define a camber in the respective spring arms 406 so the spring arms 406 function as semi-elliptical springs to assist in securing the electrical connector 600 to the junction box 200. Additionally, the flange portion 404 of the securing spring clip 400 defines a curved edge 414 (FIGS. 35 & 38) forming a horseshoe shaped receiving space 408 for engaging the threaded section 604 of the connector body 604. It is preferred that the curved edge 414 have a curvature substantially similar to the threaded section 604 and snugly fit around the root 610 of the threaded section 604 (see FIGS. 36-38).

After the threaded section 604 is in the knockout hole 230, lip 606 abuts against the exterior surface 220 and the securing spring clip 400 is engaged with threaded section 604 of the connector body 604, the threaded ring 700 is threaded onto threaded section 604 engaging the spring arms 406 to simultaneously secure the threaded ring 700, the securing spring clip 402 and electrical connector 600 in the knockout hole 230. The cambers in the spring arms 406 provide sufficient tension between all elements to adequately lock them in position.

Referring to FIGS. 35-38, the electrical connector body 602 further includes a conduit-securing fastener for securing the electrical conduit within the electrical connector body 602 in a manner previously described herein. In particular, the securing fastener may include threaded bushings 138 to accept the threaded bolt 608 that is used to secure the electrical conduit within the electrical connector body 602 in a conventional manner, e.g. see FIG. 36, 37. The mounting bushings 138 may be integral with the connector body 602 or a separate structures secured to suitable openings defined in the connector body 602.

Ninth Embodiment

FIG. 40 is a side, partial cross-sectional view of an alternative configuration, i.e., a ninth embodiment, of the electrical connector 1400 of this invention, secured to a junction box 200 wherein like numbered parts function in the same manner as previously described.

Tenth Embodiment

FIG. 41 is a side, partial cross-sectional view of an alternative configuration, i.e., a tenth embodiment, of the electrical connector 1500 of this invention, secured to a junction box 200 wherein like numbered parts function in the same manner as previously described.

Eleventh Embodiment

FIG. 42 is a side, partial cross-sectional view of an alternative configuration, i.e., an eleventh embodiment, of the electrical connector 1600 of this invention, secured to a junction box 200, wherein like numbered parts function in the same manner as previously described.

Twelfth Embodiment

FIG. 43 is a side, partial cross-sectional view of another alternative configuration, i.e., a twelfth embodiment, of the electrical connector 1700 of this invention, secured to a junction box 200, wherein like numbered parts function in the same manner as previously described.

Broadly, the universal connector uses a tongue and groove locating system to position the connector in the opening and is a threadless connection. However, in certain environments the connection can be a threaded connection. The connector uses a plurality of contact surfaces, as depicted five (5) contact surfaces, for connecting and securing the connector to the opening. A pressure locking mechanism, e.g., spring or screw mounted mechanism, is provided for securely mounting the connector in position, either temporarily mounted or permanently mounted to the system.

As indicated, this specification describes in detail the invention as it relates to an electrical conduit connector and system and fluid piping system. However, it is not limited to such environments and may be used in any system wherein a tubular member (rod, pipe, tube, cable, etc.) is required to be connected to an opening or hole. Those skilled in the art may make modifications and alterations to these embodiments without departing from the scope and spirit of the invention. Accordingly, the foregoing description is intended to be illustrative rather than restrictive.

The invention claimed is:

1. An electrical connector for connecting rigid or flexible electrical conduit to a wall of a junction box having an opening therein, edges surrounding the opening and a surrounding interior surface of the wall surrounding the opening and a surrounding exterior surface of the wall surrounding the opening, comprising:

a one piece connector body defining a conduit supporting passageway having a conduit central axis, a proximal end, a distal end, and a sidewall extending between the proximal end and the distal end, the distal end formed with a substantially cylindrical locating collar having a leading lug and an opposed trailing lug and a recess having a bottom substantially encircling the connector body, the recess being sufficiently deep that when the connector body is tilted and the leading lug of the locating collar is urged toward the edge surrounding the opening and the bottom of the recess contacts the edge surrounding the opening, the opposed trailing lug of the locating collar can pass through the opening and the locating collar can then be centered to engage the edges surrounding the opening in the junction box and the surrounding interior surface of the junction box and maintain the conduit central axis substantially perpendicular to the wall of the junction box;

a pressure lock mechanism for removably securing the connector body to the opening in the junction box, the pressure lock mechanism comprising a sleeve extending outward from the sidewall of the connector body having a central axis that is substantially parallel to the conduit central axis, a threaded bolt securing fastener engaged in the sleeve having a distal end, the securing fastener having a central axis substantially parallel to the conduit central axis and substantially perpendicular to the wall of the junction box, wherein the securing fastener can be selectively tightened to cause the distal end of the securing fastener to abut completely and solely against the surrounding exterior surface of the wall of the junction box and to draw the locating collar tightly against the surrounding interior surface of the junction box with sufficient force to prevent the dislodgement of the connector body from the opening, and selectively loosened to cause the distal end of the securing fastener to separate from the wall of the junction box whereby the connector is selectively secured to or removed from the junction box.

2. The electrical connector as claimed in claim 1, wherein the connector body defining a distal-facing bearing surface, and the locating collar functioning to engage the edges of the opening and the surrounding interior surface of the junction box comprises:

a foot portion comprising the leading lug defining a leading perimeter edge, the trailing lug defining a trailing perimeter edge, and lateral walls connecting the leading perimeter edge and the trailing perimeter edge, the leading lug and the trailing lug each defining a proximal-facing seating surface, and the lateral walls having a proximal edge and a distal edge, a locating ledge formed on the leading lug proximal-facing seating surface and defining a leading locating surface and proximal-facing locating surface, the proximal-facing locating surface sloping from a central high point to the proximal edge of the respective lateral walls; and a locating collar formed adjacent the trailing lug so as to be positioned between the distal-facing bearing surface on the connector body and the trailing lug.

3. The electrical connector as claimed in claim 2, wherein the sleeve extends outward from the sidewall over the leading lug such that a distal end of the securing fastener when secured to the junction box opposes the leading lug proximal-facing seating surface.

4. The electrical connector as claimed in claim 1, wherein the connector body comprises a distal flange extending at least partially about the connector body and the engaging portion is formed distally of the distal flange.

5. The electrical connector as claimed in claim 4, wherein the distal flange on the connector body extends outward past the perimeter edge of the trailing lug.

* * * * *